US010216082B2

(12) United States Patent
Kang et al.

(10) Patent No.: US 10,216,082 B2
(45) Date of Patent: Feb. 26, 2019

(54) LAYOUT DESIGN SYSTEM, SYSTEM AND METHOD FOR FABRICATING MASK PATTERN USING THE SAME

(71) Applicants: Dae-kwon Kang, Yongin-si (KR); Ji-Young Jung, Hwaseong-si (KR); Dong-Gyun Kim, Seoul (KR); Jae-Seok Yang, Hwaseong-si (KR); Sung-Keun Park, Goyang-si (KR); Young-Gook Park, Seongnam-si (KR)

(72) Inventors: Dae-kwon Kang, Yongin-si (KR); Ji-Young Jung, Hwaseong-si (KR); Dong-Gyun Kim, Seoul (KR); Jae-Seok Yang, Hwaseong-si (KR); Sung-Keun Park, Goyang-si (KR); Young-Gook Park, Seongnam-si (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 188 days.

(21) Appl. No.: 15/001,854

(22) Filed: Jan. 20, 2016

(65) Prior Publication Data

US 2016/0306914 A1   Oct. 20, 2016

(30) Foreign Application Priority Data

Apr. 14, 2015   (KR) .................. 10-2015-0052492

(51) Int. Cl.
*G06F 17/50* (2006.01)
*G21K 5/00* (2006.01)
(Continued)

(52) U.S. Cl.
CPC ............ *G03F 1/70* (2013.01); *G03F 7/70433* (2013.01); *G03F 7/70466* (2013.01); *G03F 1/00* (2013.01);
(Continued)

(58) Field of Classification Search
CPC ............ G06F 17/5072; G06F 17/5081; G06F 2217/12; G06F 19/00; G21K 5/00; G03F 1/00; G03F 7/70433; G03F 7/70466
(Continued)

(56) References Cited

U.S. PATENT DOCUMENTS 4,617,094 A * 10/1986 Kamamori ........ G02F 1/133516
204/478
5,537,586 A * 7/1996 Amram ............. G06F 17/30707
(Continued)

FOREIGN PATENT DOCUMENTS

JP  2006080224 A  *  3/2006  ......... G06F 17/5081
JP  2009086864 A  *  4/2009
(Continued)

*Primary Examiner* — Phallaka Kik
(74) *Attorney, Agent, or Firm* — Harness, Dickey & Pierce, P.L.C.

(57) ABSTRACT

According to example embodiments of inventive concepts, a layout design system includes a processor, a storage unit configured to store a layout design, and a stitch module. The layout design includes a first pattern group and a second pattern group disposed in accordance with a design. The first pattern group including a first pattern for patterning at a first time. The second pattern group including a second pattern for patterning at a second time that is different than the first time. The stitch module is configured to detect an iso-pattern of the second pattern using the processor. The stitch module is configured to repetitively designate at least one of the first pattern, which is spaced apart from the iso-pattern by a pitch or more, to the second pattern group using the processor.

19 Claims, 33 Drawing Sheets

(51) Int. Cl.
*G03F 1/00* (2012.01)
*G03F 7/00* (2006.01)
*G03F 1/70* (2012.01)
*G03F 7/20* (2006.01)

(52) U.S. Cl.
CPC ...... *G06F 17/5072* (2013.01); *G06F 17/5081* (2013.01); *G06F 2217/12* (2013.01); *G21K 5/00* (2013.01)

(58) Field of Classification Search
USPC ..... 716/53, 52, 55, 111, 112, 122, 123, 124, 716/125; 703/16; 430/4, 5; 378/34, 35; 700/98, 120, 121, 109, 110
See application file for complete search history.

(56) References Cited

U.S. PATENT DOCUMENTS

| | | | | |
|---|---|---|---|---|
| 5,604,059 | A * | 2/1997 | Imura | G03F 1/30 430/311 |
| 5,994,004 | A * | 11/1999 | Tabata | G03F 1/30 430/5 |
| 6,296,977 | B1 * | 10/2001 | Kaise | G03F 7/70241 430/22 |
| 6,420,077 | B1 * | 7/2002 | Chen | G03F 1/36 430/30 |
| 7,802,226 | B2 * | 9/2010 | Park | G03F 1/70 716/54 |
| 7,861,196 | B2 | 12/2010 | Huckabay et al. | |
| 7,910,266 | B2 * | 3/2011 | Yasuzato | G03F 1/30 430/311 |
| 8,119,310 | B1 | 2/2012 | Lu et al. | |
| 8,275,584 | B2 * | 9/2012 | Lin | G01R 31/3008 702/118 |
| 8,359,556 | B1 | 1/2013 | Abou Ghaida et al. | |
| 8,434,033 | B2 | 4/2013 | Abou Ghaida et al. | |
| 8,484,607 | B1 | 7/2013 | Tang et al. | |
| 8,490,030 | B1 * | 7/2013 | Chiang | G06F 17/50 716/51 |
| 8,516,402 | B1 * | 8/2013 | Wang | G03F 1/70 716/52 |
| 8,516,403 | B2 | 8/2013 | Abou Ghaida et al. | |
| 8,572,521 | B2 | 10/2013 | Chen et al. | |
| 8,601,409 | B1 * | 12/2013 | Chen | G06F 17/50 716/54 |
| 8,689,151 | B1 | 4/2014 | Agarwal et al. | |
| 8,732,628 | B1 * | 5/2014 | Wu | G03F 1/38 430/30 |
| 8,745,556 | B2 | 6/2014 | Chen et al. | |
| 8,799,844 | B2 | 8/2014 | Cho et al. | |
| 9,081,286 | B2 * | 7/2015 | Odani | G03F 7/203 |
| 9,251,299 | B1 * | 2/2016 | Salowe | G06F 17/50 |
| 9,841,669 | B2 * | 12/2017 | Park | G03F 1/50 |
| 9,846,754 | B2 * | 12/2017 | Bae | G06F 17/505 |
| 9,880,461 | B2 * | 1/2018 | Park | G03F 1/50 |
| 10,013,520 | B2 * | 7/2018 | Lin | G06F 17/5081 |
| 2001/0004245 | A1 * | 6/2001 | Shiba | G06F 17/5081 341/50 |
| 2001/0021546 | A1 * | 9/2001 | Suwa | G03F 1/44 430/5 |
| 2002/0031712 | A1 * | 3/2002 | Tani | G03F 7/70633 430/5 |
| 2004/0115539 | A1 * | 6/2004 | Broeke | G03F 1/34 430/5 |
| 2006/0019173 | A1 * | 1/2006 | Yamamoto | G03F 1/20 430/5 |
| 2006/0053402 | A1 * | 3/2006 | Kyoh | G06F 17/5081 716/53 |
| 2006/0123380 | A1 * | 6/2006 | Ikeuchi | G06F 17/5081 716/52 |
| 2006/0190875 | A1 * | 8/2006 | Arisawa | G03F 1/84 716/52 |
| 2006/0272535 | A1 * | 12/2006 | Seki | B82Y 10/00 101/492 |
| 2006/0273266 | A1 * | 12/2006 | Preil | G03F 1/84 250/548 |
| 2006/0275678 | A1 * | 12/2006 | Hoshino | G03F 1/32 430/30 |
| 2006/0283962 | A1 * | 12/2006 | Silverstein | G06F 3/03542 235/494 |
| 2008/0092099 | A1 * | 4/2008 | Lin | G06F 17/5072 716/122 |
| 2008/0166639 | A1 * | 7/2008 | Park | G03F 1/68 430/5 |
| 2009/0181314 | A1 * | 7/2009 | Shyu | G03F 1/36 430/5 |
| 2009/0186286 | A1 * | 7/2009 | Ausschnitt | G03F 7/70633 430/30 |
| 2010/0021825 | A1 * | 1/2010 | Kodama | G03F 1/36 430/5 |
| 2010/0104954 | A1 * | 4/2010 | Fu | G03F 1/36 430/5 |
| 2010/0191357 | A1 * | 7/2010 | Maeda | G06F 17/5068 700/97 |
| 2011/0003254 | A1 | 1/2011 | Chang et al. | |
| 2011/0032499 | A1 * | 2/2011 | Kawashima | G03B 27/42 355/53 |
| 2011/0113393 | A1 * | 5/2011 | Sezginer | G06F 17/5077 716/106 |
| 2011/0294239 | A1 * | 12/2011 | Kodama | G03F 1/36 438/16 |
| 2012/0198404 | A1 * | 8/2012 | Hasebe | G03F 7/70441 716/112 |
| 2012/0219886 | A1 * | 8/2012 | Fujimura | G03F 1/78 430/5 |
| 2012/0221984 | A1 * | 8/2012 | DeMaris | G03F 7/70125 716/54 |
| 2012/0316855 | A1 * | 12/2012 | Park | G01N 21/9501 703/13 |
| 2013/0004739 | A1 * | 1/2013 | Odani | G03F 7/203 428/195.1 |
| 2013/0062771 | A1 | 3/2013 | Kodama et al. | |
| 2013/0074018 | A1 * | 3/2013 | Hsu | G03F 1/70 716/55 |
| 2013/0100431 | A1 * | 4/2013 | Kajiyama | G03F 9/7084 355/72 |
| 2013/0205266 | A1 * | 8/2013 | Chen | G06F 17/5077 716/55 |
| 2013/0295698 | A1 * | 11/2013 | Pforr | G03F 1/38 438/14 |
| 2014/0106119 | A1 * | 4/2014 | Ueba | G03F 7/0046 428/131 |
| 2014/0162460 | A1 * | 6/2014 | Lee | G06F 17/5081 438/703 |
| 2014/0213066 | A1 | 7/2014 | Tung | |
| 2014/0237436 | A1 | 8/2014 | Li et al. | |
| 2014/0282293 | A1 * | 9/2014 | Lin | G06F 17/5081 716/52 |
| 2014/0293469 | A1 * | 10/2014 | Yu | G02B 5/201 359/891 |
| 2015/0040077 | A1 * | 2/2015 | Ho | G03F 7/70433 716/51 |
| 2015/0095857 | A1 * | 4/2015 | Hsu | G06F 17/5081 716/52 |
| 2015/0100935 | A1 * | 4/2015 | Lin | G06F 17/5081 716/111 |
| 2015/0242555 | A1 * | 8/2015 | Wang | G06F 17/5068 438/694 |
| 2016/0342081 | A1 * | 11/2016 | Park | G03F 7/0002 |
| 2017/0147688 | A1 * | 5/2017 | Chaturvedi | G06F 17/30705 |

FOREIGN PATENT DOCUMENTS

| | | | | |
|---|---|---|---|---|
| JP | 2009156927 A | * | 7/2009 | .......... G03G 15/161 |
| JP | 2010175733 A | * | 8/2010 | ........ G06F 17/5068 |
| JP | 2010238149 A | * | 10/2010 | |
| KR | 2010-0025822 A | | 3/2010 | |

* cited by examiner

1200

1300

1400

LAYOUT DESIGN SYSTEM, SYSTEM AND METHOD FOR FABRICATING MASK PATTERN USING THE SAME

CROSS-REFERENCE TO RELATED APPLICATION

This application claims priority under 35 U.S.C. § 119 to Korean Patent Application No. 10-2015-0052492 filed on Apr. 14, 2015 in the Korean Intellectual Property Office, and all the benefits accruing therefrom under 35 U.S.C. 119, the contents of which in its entirety are herein incorporated by reference.

BACKGROUND

1. Field

The present disclosure relates to a layout design system, and/or a system and/or a method for fabricating a mask pattern using the same.

2. Description of Related Art

Fabricating processes of semiconductor devices are becoming increasingly miniaturized and integrated. Thus, in a process of 20 nm or less, a double patterning technology (DPT) or a triple patterning technology (TPT) may be used as an extreme ultra violet (EUV) alternative technique according to the limit of a photolithography process. At this time, a process defective bridge, a critical dimension difference or the like may occur during photolithography and etching processes may occur due to differences in pattern pitch and pattern density of the DPT/TPT.

SUMMARY

Example embodiments relate to a layout design system that reduces patterning failure due to differences in pitch and density of the pattern.

Example embodiments also relate to a system for fabricating a mask pattern that reduces patterning failure due to differences in pitch and density of the pattern.

Example embodiments also relate to a method for fabricating a mask pattern that reduces patterning failure due to differences in pitch and density of the pattern.

According to example embodiments of inventive concepts, a layout design system includes a processor, a storage unit, and a stitch module. The storage unit is configured to store a layout design. The layout design includes a first pattern group and a second pattern group disposed in accordance with a design. The first pattern group includes a first pattern for patterning at a first time. The second pattern group includes a second pattern for patterning at a second time different from the first time. The stitch module is configured to detect an iso-pattern of the second pattern using the processor. The stitch module is configured to repetitively designate at least one of the first pattern, which is spaced apart from the iso-pattern by a pitch or more, to the second pattern group using the processor.

In example embodiments of inventive concepts, the storage unit may be configured to store a cutting module, and the cutting module may be configured to divide the layout design into a plurality of sub-layout designs.

In example embodiments of inventive concepts, the iso-pattern may exist alone in one of the sub-layout designs.

In example embodiments of inventive concepts, a length of the sub-layout design may be determined in consideration of an etch skew.

In example embodiments of inventive concepts, the storage unit may be configured to store a decomposition module. The decomposition module may be configured to be supplied with a pre layout design including a plurality of patterns. The processor may be configured to convert the plurality of patterns. The processor may be configured to generate a link connecting the nodes to classify the plurality of patterns into the first or second pattern group and form the layout design.

In example embodiments of inventive concepts, the decomposition module may be configured to classify the two nodes sharing one link into the different groups of each of the first and second pattern groups.

In example embodiments of inventive concepts, the decomposition module may be configured to classify a pattern, which cannot be classified into both the first and second pattern groups, into a conflict pattern. The conflict pattern may include first and second regions partially overlapping each other. The stitch module may be configured to classify the first region into the first pattern group. The stitch module may be configured to classify the second region into the second pattern group. A region in which the first and second regions overlap each other may be repetitively designated as the first and second pattern groups.

In example embodiments of inventive concepts, the first and second regions may be determined in accordance with the design rule.

In example embodiments of inventive concepts, the repetitive designation of at least one of the first patterns into the second pattern group by the stitch module may include first repetitive designation of at least one first pattern of the first patterns spaced apart from the iso-pattern by the pitch or more into the second pattern group, and second repetitive designation of at least one of the first patterns spaced apart from the first repetitively designated first pattern by the pitch or more into the second pattern group.

In example embodiments of inventive concepts, the repetitively designated first patterns may include a superposition region and a non-superposition region that do not overlap each other, and the repetitive designation of at least one of the first pattern into the second pattern by the stitch module may include repetitive designation of the superposition region into the second pattern, and non-repetitive designation of the non-superposition region into the second pattern.

In example embodiments of inventive concepts, a length of the superposition region may be determined in consideration of an etch skew.

In example embodiments of inventive concepts, the design rule may include separation of the pitch between the first and second patterns by a regular pitch or more.

In example embodiments of inventive concepts, the first time may be faster than the second time.

According to example embodiments of inventive concepts, a system for fabricating a mask pattern includes a layout designer configured to repetitively designate at least one of first patterns spaced apart from a second pattern by a pitch or more as a second pattern group to generate a second layout design, in a first layout design which includes a first pattern group including the plurality of first patterns and a second pattern group including one second pattern, and a mask pattern former configured to form a first mask pattern corresponding to the first pattern at a first time, and to form a second mask pattern corresponding to the second pattern at a second time different from the first time, based on the second layout design.

In example embodiments of inventive concepts, the system may further include an etch skew corrector configured to correct critical dimensions of the first and second patterns of the second layout design.

In example embodiments of inventive concepts, the etch skew corrector may be configured to correct the critical dimensions (CD) of the respective first patterns according to the pitch between the first pattern groups and to correct the critical dimensions of the respective second patterns according to the pitch between the second pattern groups.

In example embodiments of inventive concepts, the etch skew corrector may be configured to correct the critical dimensions of the respective first patterns to a first dimension when the pitch between the first pattern groups is a first pitch, and the etch skew corrector may be configured to correct the critical dimensions of the respective first patterns to a second dimension greater than the first dimension when the pitch between the first patter groups is a second pitch greater than the first pitch.

In example embodiments of inventive concepts, the system may further comprise an optical proximity corrector configured to perform optical proximity correction (OPC) of the first and second patterns of the second layout design.

In example embodiments of inventive concepts, the system may further include an etch skew corrector configured to correct the critical dimensions of the first and second patterns of the second layout design. The optical proximity corrector may be configured to perform the optical proximity correction of the critical dimensions of the first and second patterns after the skew corrector corrects the critical dimensions of the first and second patterns.

In example embodiments of inventive concepts, the first and second mask patterns may be formed on a same level.

In example embodiments of inventive concepts, the layout designer may include a processor, a stitch module and a storage unit. The storage unit may be configured to store the first layout design. The stitch module may be configured to repetitively designate at least one of the first pattern spaced apart from the iso-pattern by the pitch or more as the second pattern group, using the processor.

According to example embodiments of inventive concepts, there is provided a recording medium readable by a computer which stores software capable of performing a method, the method comprising receiving a layout design which includes a first pattern group and a second pattern group disposed in accordance with a design rule, the first pattern group including a first pattern for patterning at a first time, and the second pattern group including a second pattern for patterning at a second time different from the first time, detecting an iso-pattern of the second pattern and repetitively designating at least one of the first pattern spaced apart from the iso-pattern by a pitch or more as the second pattern group.

According to example embodiments of inventive concepts, a layout design method includes receiving a layout design that includes a first pattern group and a second pattern group disposed in accordance with a design rule, the first pattern group including a first pattern for patterning at a first time, and the second pattern group including a second pattern for patterning at a second time later than the first time, detecting an iso-pattern of the second pattern and repetitively designating at least one of the first pattern spaced apart from the iso-pattern by a pitch or more as the second pattern group.

In example embodiments of inventive concepts, the detecting the iso-pattern may include separating the layout design into a plurality of sub-layout designs and detecting the second pattern present independently in the sub-layout design as the iso-pattern.

In example embodiments of inventive concepts, the separating the layout design into the plurality of sub-layout designs may include separating the layout design into the plurality of the sub-layout designs to a length according to an etch skew.

In example embodiments of inventive concepts, the receiving the layout design may include receiving a pre layout design including a plurality of patterns and forming the layout design, by converting the plurality of patterns into nodes using the processor, generating a link connecting the nodes and classifying the plurality of patterns into the first or second pattern group.

In example embodiments of inventive concepts, forming the layout design by classifying the plurality of patterns into the first or second pattern group may include classifying two nodes sharing one link into different groups of each of the first and second pattern groups.

In example embodiments of inventive concepts, the forming the layout design by classifying the plurality of patterns into the first or second pattern group may include classifying a pattern, which cannot be classified into both the first and second pattern groups, into a conflict pattern, the conflict pattern including first and second regions partially overlapping each other and classifying the first region into the first pattern group and classifying the second region into the second pattern group, an overlap region of the first and second regions being repetitively designated as the first and second pattern groups.

In example embodiments of inventive concepts, the repetitively designating at least one of the first patterns as the second pattern group may include first repetitively designating the nearest first patterns of the first patterns spaced apart from the iso-pattern by the pitch or more as the second pattern group, and second repetitively designating at least one of the first patterns spaced apart from the first repetitively designated first pattern by the pitch or more as the second pattern group.

In example embodiments of inventive concepts, the repetitively designated first patterns may include an superposition region and a non-superposition region that do not overlap each other, and the repetitively designating at least one of the first pattern as the second pattern may include repetitively designating the superposition region as the second pattern and not repetitively designating the non-superposition region as the second pattern.

According to example embodiments of inventive concepts, a method for fabricating a mask pattern may include receiving a layout design including a first pattern and a second pattern from a storage unit, performing a first etch skew correction on the first pattern, performing a second etch skew correction different from the first etch skew correction, on an iso-pattern of the second pattern and the first pattern spaced apart from the iso-pattern by a pitch or more.

In example embodiments of inventive concepts, the method may further include performing an optical proximity correction of the first and second patterns, after the first and second etch skew corrections.

In example embodiments of inventive concepts, the method may further include forming a first hard mask pattern corresponding to the first pattern, and forming a second hard mask pattern corresponding to the second pattern.

In example embodiments of inventive concepts, the first and second hard mask patterns may be formed on a same level.

In example embodiments of inventive concepts, the first and second hard mask patterns may be formed at different times.

In example embodiments of inventive concepts, the method may further include patterning the first pattern using the first hard mask pattern as a mask, and patterning the second pattern using the second hard mask pattern as a mask.

According to example embodiments of inventive concepts, a layout design system includes a layout designer including a storage unit, a decomposition module, a stitch module, and a processor. The storage unit is configured to store a layout design. The decomposition module is configured to decompose the layout design into a plurality of pattern groups using the processor. The plurality of pattern groups include a first pattern group including a first pattern, a second pattern group including second patterns for patterning at a first time, and a third pattern group including third patterns for patterning at a second time after the first time. The first to third patterns are spaced apart from each other in a plan view. The stitch module is configured to designate the first pattern as an iso pattern. The stitch module is configured to generate a stitch pattern using the processor for reducing an iso-density (ID) bias of the iso pattern compared to the ID bias of the iso pattern without the stitch pattern being formed. The stitch pattern includes a first stitch pattern and a second stitch pattern. The first stitch pattern overlaps one of the first patterns. The second stitch pattern overlaps one of the second patterns. The first stitch pattern is spaced apart from a first side of the iso pattern by a first distance. The second stitch pattern is spaced apart from a second side of the iso pattern by a second distance. The first and second distances each are greater than or equal to a minimum pitch away from the iso pattern for limiting an occurrence of a bridge.

In example embodiments, the layout designer may further include a cutting module that is configured to separate the layout design into a plurality of sub-layout designs.

In example embodiments, the layout design system may further include an etch skew corrector configured to adjust critical dimensions of the first and second patterns using the processor based on respective pitches of the first and second patterns.

In example embodiments, the layout design system may further include an optical proximity corrector configured to perform optical proximity correction (OPC) on the first and second patterns using the processor after the layout is subjected to an etch skew correction using the etch skew corrector. The storage unit may be a non-volatile memory device, a hard disk drive, or a magnetic storage device In example embodiments, the layout design system may further include a mask pattern former configured to form a mask based on the layout after the optical proximity corrector performs optical proximity correction on the layout.

BRIEF DESCRIPTION OF THE DRAWINGS

The foregoing and other features of inventive concepts will be apparent from the more particular description of non-limiting embodiments of inventive concepts, as illustrated in the accompanying drawings in which like reference characters refer to like parts throughout the different views. The drawings are not necessarily to scale, emphasis instead being placed upon illustrating principles of inventive concepts. In the drawings.

DETAILED DESCRIPTION OF EXAMPLE EMBODIMENTS

Figure 1:
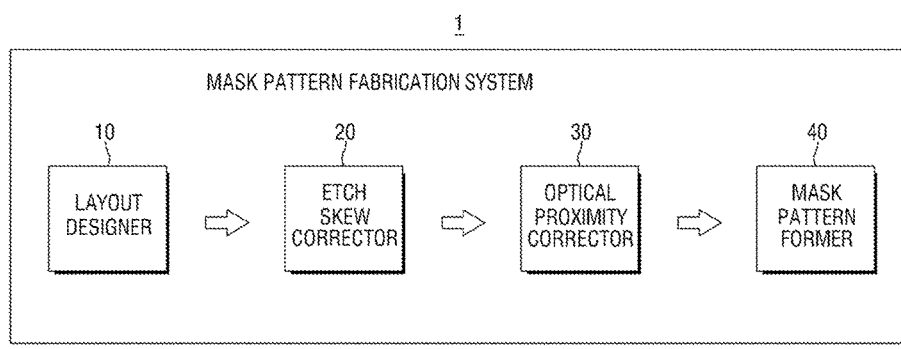
FIG. 1 is a block diagram for explaining a system for fabricating a mask pattern according to example embodiments of inventive concepts.

Example embodiments will now be described more fully with reference to the accompanying drawings, in which some example embodiments are shown. Example embodiments, may, however, be embodied in many different forms and should not be construed as being limited to the embodiments set forth herein; rather, these example embodiments are provided so that this disclosure will be thorough and complete, and will fully convey the scope of example embodiments of inventive concepts to those of ordinary skill in the art. In the drawings, the thicknesses of layers and regions are exaggerated for clarity. Like reference characters and/or numerals in the drawings denote like elements, and thus their description may not be repeated.

It will be understood that when an element or layer is referred to as being "connected to," or "coupled to" another element or layer, it can be directly connected to or coupled to another element or layer or intervening elements or layers may be present. In contrast, when an element is referred to as being "directly connected to" or "directly coupled to" another element or layer, there are no intervening elements or layers present Like numbers refer to like elements throughout. As used herein, the term "and/or" includes any and all combinations of one or more of the associated listed items.

It will also be understood that when a layer is referred to as being "on" another layer or substrate, it can be directly on the other layer or substrate, or intervening layers may also be present. In contrast, when an element is referred to as being "directly on" another element, there are no intervening elements present.

It will be understood that, although the terms first, second, etc. may be used herein to describe various elements, these elements should not be limited by these terms. These terms are only used to distinguish one element from another element. Thus, for example, a first element, a first component or a first section discussed below could be termed a second element, a second component or a second section without departing from the teachings of example embodiments of inventive concepts.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises", "comprising", "includes" and/or "including," if used herein, specify the presence of stated features, integers, steps, operations, elements and/or components, but do not preclude the presence or addition of one or more other features, integers, steps, operations, elements, components and/or groups thereof. Expressions such as "at least one of," when preceding a list of elements, modify the entire list of elements and do not modify the individual elements of the list.

Unless otherwise defined, all terms (including technical and scientific terms) used herein have the same meaning as commonly understood by one of ordinary skill in the art to which example embodiments belong. It will be further understood that terms, such as those defined in commonly-used dictionaries, should be interpreted as having a meaning that is consistent with their meaning in the context of the relevant art and will not be interpreted in an idealized or overly formal sense unless expressly so defined herein.

Although corresponding plan views and/or perspective views of some cross-sectional view(s) may not be shown, the cross-sectional view(s) of device structures illustrated herein provide support for a plurality of device structures that extend along two different directions as would be illustrated in a plan view, and/or in three different directions as would be illustrated in a perspective view. The two different directions may or may not be orthogonal to each other. The three different directions may include a third direction that may be orthogonal to the two different directions. The plurality of device structures may be integrated in a same electronic device. For example, when a device structure (e.g., a memory cell structure or a transistor structure) is illustrated in a cross-sectional view, an electronic device may include a plurality of the device structures (e.g., memory cell structures or transistor structures), as would be illustrated by a plan view of the electronic device. The plurality of device structures may be arranged in an array and/or in a two-dimensional pattern.

A system 1 for fabricating a mask pattern according to example embodiments of inventive concepts will be described below referring to FIG. 1.

FIG. 1 is a block diagram for explaining a system for fabricating a mask pattern according to example embodiments of inventive concepts.

Referring to FIG. 1, the system 1 for fabricating the mask pattern according to example embodiments of inventive concepts includes a layout designer 10, an etch skew corrector 20, an optical proximity corrector 30 and a mask pattern former 40.

The layout designer 10 can form a layout design that is used for fabricating the semiconductor device. The layout design can be formed by the layout designer 10 and can be transferred to the etch skew corrector 20. The layout designer 10 can design the layout of the semiconductor device so as to form a desired semiconductor element, and at this time, the layout design can be designed according to a design rule depending on the restriction conditions on the process.

The layout design includes a plurality of patterns, and the plurality of patterns can have a very narrow pitch. While the semiconductor element is increasingly miniaturized, each pattern has a narrower pitch, which may cause non-uniformity of a bridge, by which the respective patterns are connected to one another in a future process, and a critical dimension. Therefore, DPT or TPT may be used for a patterning process. DPT and TPT complete a whole pattern through several patterning operations rather than patterning the plurality of patterns in a single operation.

The etch skew corrector 20 can correct the critical dimensions of the patterns appearing on the layout design. That is, when using a plurality of processes such as DPT or TPT, the determination of which pattern is formed in what order also needs to be displayed on the layout design. The layout designer 10 can determine the patterning order of each pattern. Thus, in the patterns patterned by the different orders, since the actually formed critical dimension may change by the pitch between the patterns patterned at the same time, it may be necessary to perform the correction associated therewith. The etch skew corrector 20 can correct the critical dimensions of each pattern by utilizing the pitch between the patterns patterned in the same order. The corrected patterns can be reflected to the layout design.

The optical proximity corrector 30 can perform the optical proximity correction of the layout design that is subjected to the etched skew correction. However, the orders of the optical proximity correction and the etch skew correction may change each other, without being limited thereto.

Actually, the patterning passes through the steps of forming a mask, photolithographing the same, and etching the photolithographed portion. At this time, as the pitch between patterns is narrowed, photolithography of a portion to be patterned can have a difference from the shape of the mask. Thus, it is necessary to correct the shape of the mask, depending on the characteristics of the light source of the photolithography process.

The optical proximity corrector 30 can correct the critical dimension of the patterns on the layout design so as to eliminate the inconsistency on the photolithography process. The optical proximity corrector 30 can reflect the pattern having the corrected critical dimension to the layout design.

The mask pattern former 40 can actually form a mask pattern, using the designed and corrected layout design. A mask pattern formed by the mask pattern former 40 can be used later to form the actual pattern through the photolithography process and the etching process and can be removed.

Figure 2:
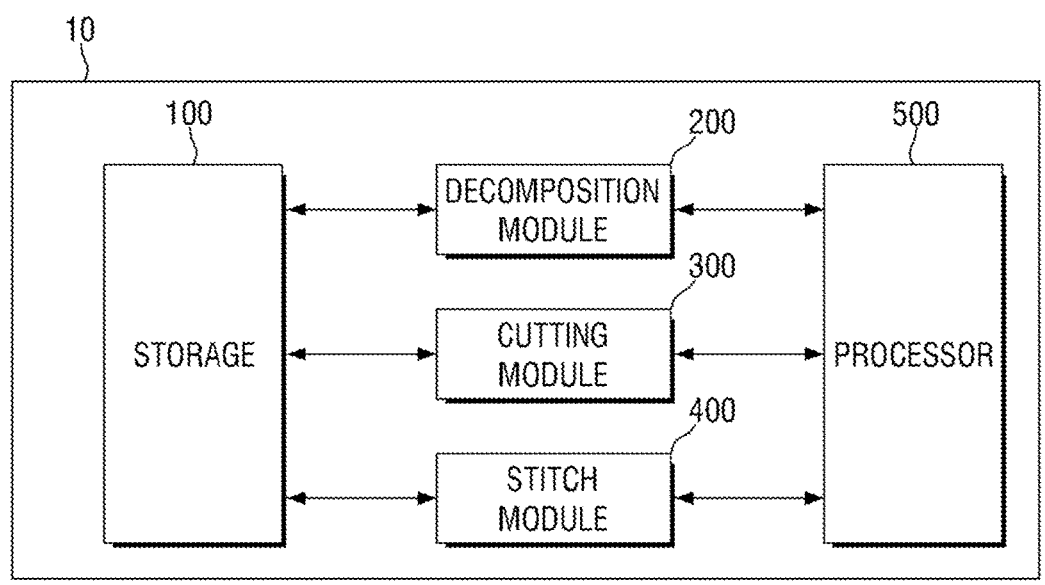
FIG. 2 is a block diagram for explaining a layout designer of FIG. 1 in detail.

Referring to FIG. 2, the layout designer 10 of the system 1 for fabricating a mask pattern according to example embodiments of inventive concepts will be described below.

FIG. 2 is a block diagram for explaining the layout designer of FIG. 1 in detail.

Referring to FIG. 2, the layout designer 10 includes a storage unit 100, a decomposition module 200, a cutting module 300, a stitch module 400 and a processor 500.

The layout design may be stored in the storage unit 10. Here, the "layout design" can be a concept that includes all the layout designs before and after the processes such as coloring, decomposition and stitch generation. However, each of the layout designs may be stored at the different locations other than the storage unit 100 without being limited thereto.

Meanwhile, the layout design can be a design that includes the shape and arrangement of the pattern for forming a semiconductor element. The layout design can store the shape of each pattern in the form of a plan view. However, it is not limited thereto.

The layout design can be designed by preset design rules. The design rules can define shapes, arrangements and pitches of a plurality of patterns. Specifically, the design rules can include a configuration in which the pitches between adjacent patterns are spaced apart from each other by a certain pitch or more.

In example embodiments of inventive concepts, the storage unit 10, for example, can be configured by a non-volatile memory device. As an example of the non-volatile memory device, a NAND flash, a NOR flash, a MRAM, a PRAM, RRAM and the like can be adopted, but example embodiments are not limited thereto. Meanwhile, in example embodiments of inventive concepts, the storage unit 10 may be constituted by a hard disk drive, a magnetic storage device or the like.

When a particular operation is used in the layout designer 10, the processor 500 can serve to perform this operation. Although it is not illustrated in detail the drawings, the processor 500 can further include a cache memory so as to improve the operation capacity.

The processor 500 may be hardware. Although the processor 500 is illustrated as a single block in FIG. 1, example embodiments are not limited thereto. That is, in example embodiments of inventive concepts, the processor 500 may also be implemented in the form of a multi-core or multi-cluster. When the processor 500 is implemented in the form of a multi-core or a multi-cluster in this way, the operational efficiency of the layout designer 10 can be improved.

Meanwhile, although it is not illustrated in detail in the drawings, the processor 500 may further include a cache memory, such as L1, L2, so as to improve the operation capacity.

In example embodiments of inventive concepts, all of the decomposition module 200, the cutting module 300 and the stitch module 400 can be implemented in the form of software, but example embodiments are not limited thereto.

In example embodiments of inventive concepts, when all of the decomposition module 200, the cutting module 300 and the stitch module 400 are implemented in the form of software, the decomposition module 200, the cutting modules 300 and the stitch module 400 may be stored in the storage unit 100 in the form of a code, and may be stored in another storage unit separated from the storage unit 100 (not illustrated) in the form of a code.

The decomposition module 200 can perform a decomposition work on the layout design that is not decomposed, using the processor 500. The decomposition means that decomposes the layout into two in the case of the DPT and decomposes the layout into three in the case of the TPT. The decomposition can be displayed through the coloring of each pattern. The coloring is a work that displays whether to initially pattern what kind of pattern and to pattern later what kind of pattern, in the patterning technology using a plurality of processes, such as the above-mentioned DPT or TPT. That is, the coloring can be performed in such a manner that a first color is allocated to the initially patterned patterns, and a second color different from the first color is allocated to the patterns patterned later. Two different colors can be used in the case of the DPT, and three different colors can be used in the case of the TPT.

The coloring process of the decomposition module 200 will be described below referring to FIG. 3. At this time, the case of the TPT using the three colors will be described for convenience.

Figure 3:
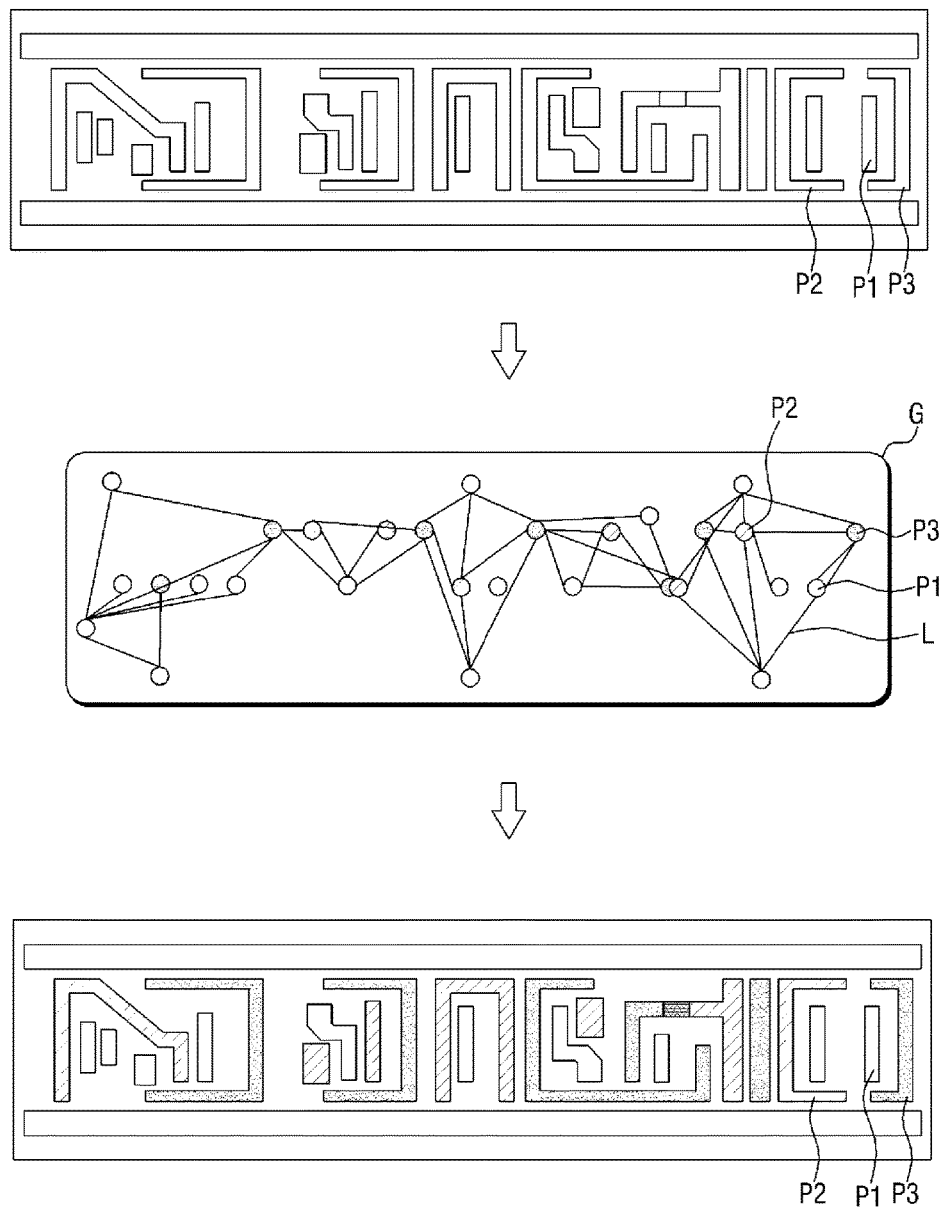
FIG. 3 is a diagram for explaining a coloring process of a coloring module of FIG. 2 in detail.

FIG. 3 is a diagram for explaining the coloring process of the decomposition module of FIG. 2 in detail.

Referring to FIG. 3, the layout design PA that is not colored includes a plurality of patterns P1, P2, P3. The plurality of patterns P1, P2, P3 can be disposed to be spaced apart from each other at regular intervals. The plurality of patterns P1, P2, P3 can be operated as the semiconductor elements by a later process.

The plurality of patterns P1, P2, P3 should be spaced apart from each other and should not be in contact with each other. However, the patterns spaced apart from each other on the layout design by the cause of the process may be actually in contact with each other after the fabricating process. In order to limit (and/or prevent) this and secure a process margin, the plurality of patterns P1, P2, P3 can be divisionally patterned into the patterns that ensure the margin several times.

The decomposition module 200 can convert the layout design PA into a graph G that includes nodes and links. The plurality of patterns P1, P2, P3 can be converted into each of the nodes N1, N2, N3. A node means a pattern that is not spaced. The decomposition module 200 can connect each of the nodes N1, N2, N3 via the links L. The links L can be connected to one another when the plurality of patterns P1, P2, P3 corresponding to each of the nodes N1, N2, N3 is adjacent to one another. If the plurality of patterns P1, P2, P3 is present over a wide area in the layout design, they may be displayed by being divided into a plurality of nodes for convenience.

The decomposition module 200 can perform the coloring on the nodes N1, N2, N3. That is, it is possible to allocate a plurality of colors to each of the nodes N1, N2, N3. At this time, the same color may not be allocated to the nodes N1, N2, N3 that share the same link L. That is, since the nodes N1, N2, N3 sharing the same link L mean the patterns P1, P2, P3 disposed adjacent to one another, it is for the purpose of sequentially patterning the adjacent patterns at other times rather than patterning them at the same time.

Specifically, different colors can be allocated to the first node N1, the second node N2 and the third node N3 by the decomposition module 200. The decomposition module 200 can convert the graph G, in which the coloring has been completed, into the layout design A again. At this time, the layout design A can be in a state in which the coloring is performed to on each of the plurality of patterns P1, P2, P3 by reflecting the results of the coloring of the graph G.

The color conflict in the course of coloring will be described below with reference to FIGS. 4 and 5.

Figure 4:
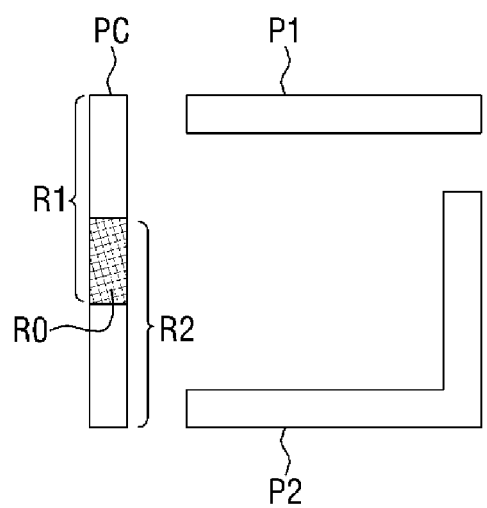
FIGS. 4 and 5 are conceptual diagrams for explaining a stitch forming process of color conflicts of a decomposition module and a stitch module of FIG. 2 in detail.
Figure 5:
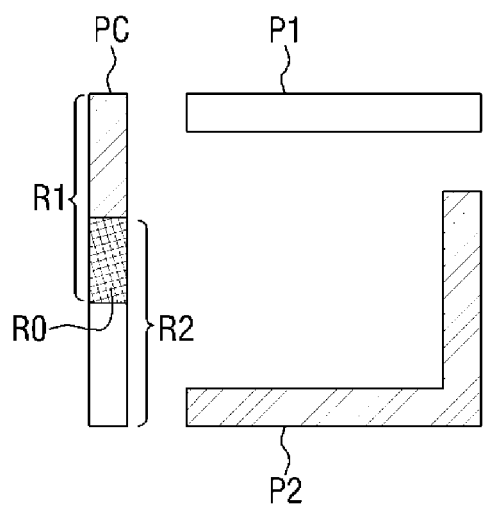

FIGS. 4 and 5 are conceptual diagrams for explaining a stitch forming process of the color conflict of the decomposition module and the stitch module of FIG. 2 in detail.

Referring to FIGS. 4 and 5, a pattern to which a desired (and/or alternatively predetermined) color cannot be allocated may exist in the process of coloring of the FIG. 3. FIG. 4 explains the case of DPT using the two colors for convenience.

Since the first pattern P1 and the second pattern P2 are adjacent to each other, the different colors need to be allocated. Therefore, the first pattern P1 can be colored by a first color, and the second pattern P2 can be colored by a second color different from the first color. At this time, since a conflict pattern Pc is adjacent to both the first pattern P1 and the second pattern P2, both the first and second colors cannot be colored. However, all the patterns within the layout design need to be colored by one of the first and second colors. Therefore, the stitch module 400 can form the stitch pattern.

The stitch module 400 can perform the coloring of one pattern to two kinds of colors using the processor 500. The stitch module 400 can dividedly perform the coloring of the first region R1 and the second region R2 of the conflict pattern Pc. Since the first region R1 is adjacent to the first pattern P1, the second color can be allocated thereto, and since the second region R2 is adjacent to the second pattern P2, the first color can be allocated thereto. At this time, the first region R1 and the second region R2 can overlap each other. In a superposition region Ro in which the first region R1 and the second region R2 overlap each other, both the first color and the second color can be colored. That is, the first and second colors can be allocated to the superposition region Ro in an overlapping manner.

The superposition region Ro can be patterned in an overlapping manner, when it is patterned later. That is, the patterning of the conflict pattern Pc can be completed by initially patterning the first region R1 including the superposition region Ro and by patterning the second region R2 also including the superposition region Ro later.

Hereinafter, a cutting process of the cutting module 300 will be described referring to FIGS. 6 and 12.

Figure 6:
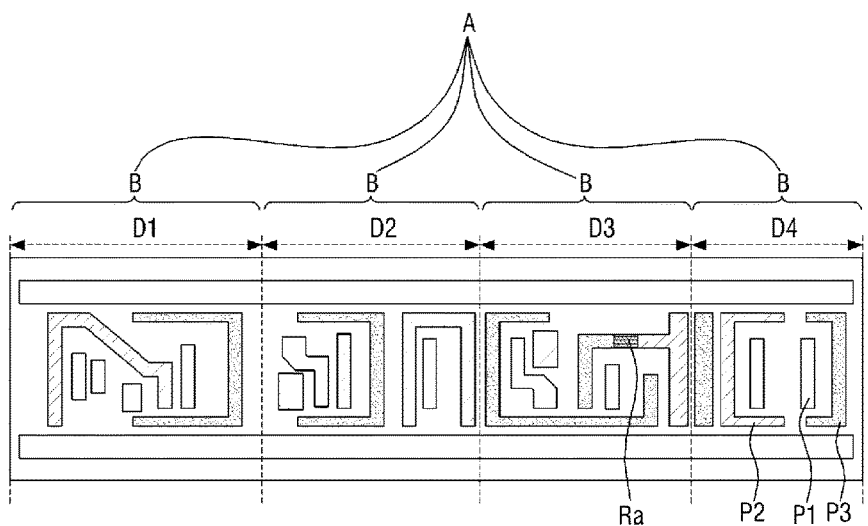
FIG. 6 is a conceptual diagram for explaining a decomposition process of a cutting module of FIG. 2 in detail.

FIG. 6 is a conceptual diagram for explaining the cutting process of the decomposition module of FIG. 2 in detail. FIG. 12 is a diagram for explaining ACI results of a method for fabricating a mask pattern according to example embodiments of inventive concepts.

Referring to FIG. 6, the cutting module 300 can cut the layout design A into a plurality of sub-layout designs B, using the processor 500. The plurality of sub-layout designs can be cut so that each of the patterns (patterns P1, P2, P3) can be appropriately patterned during patterning. Specifically, the lengths D1 to D4 of each sub-layout design B may be a length which limits the critical dimension of each pattern in a unit capable of performing the etch skew correction. The layout design A can include a stitch pattern Ra by the above-described color conflict.

Figure 12:
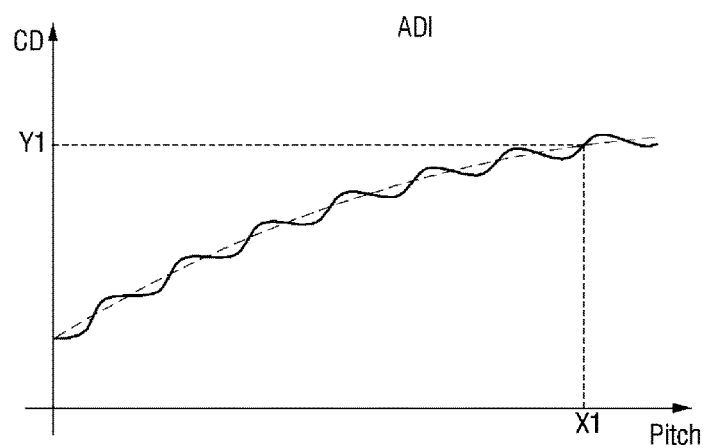
FIG. 12 is a diagram for explaining ACI results of a method for fabricating a mask pattern according to example embodiments of inventive concepts.

Referring to FIG. 12, the critical dimension of the pattern should increase as the pitch between the respective patterns increases. This is to previously correct the effect in which the etching is further enhanced as the pitch increases in the etching process. At this time, even if the pitch continuously increases, when the pitch reaches a specific value X1, it has a specific value Y1 within a certain range in a converged value of the graph of FIG. 12.

Therefore, it is possible to determine the length of the sub-layout design B based on the specific value Y1 within the desired (and/or alternatively predetermined) range in the converged value. Specifically, the lengths D1 to D4 of each sub-layout design B can be determined among the values in which the difference from X1 as the pitch in the case of Y1 is within a certain range. Thus, the etch skew correction of each pattern can be efficiently performed.

However, when there is no need for cutting, such as a case where the length of the existing layout design A is not sufficiently long, the step of cutting the layout design A may be omitted.

The stitch forming process according to the pattern pitch of the stitch module 400 will be described referring to FIGS. 7 and 8.

Figure 7:
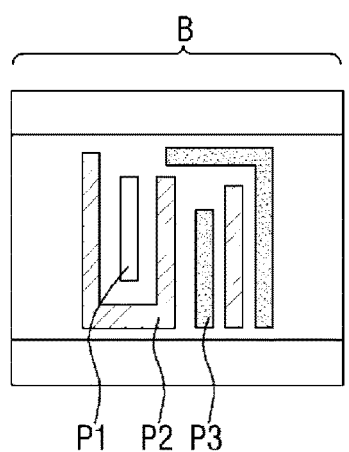
FIGS. 7 and 8 are diagrams for explaining a stitch forming process according to a pattern pitch of the stitch module of FIG. 2 in detail.
Figure 8:
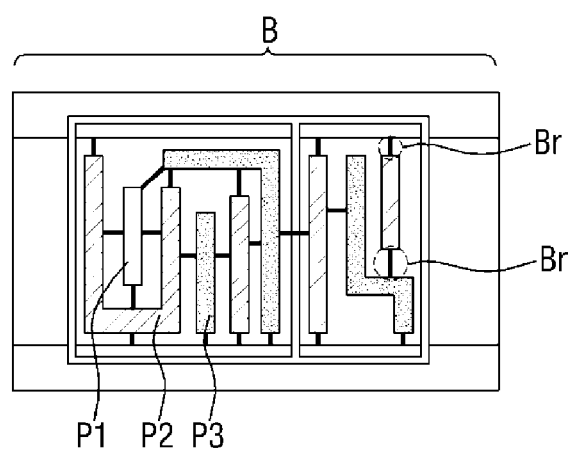

FIGS. 7 and 8 are diagrams for explaining a stitch forming process according to the pattern pitch of the stitch module of FIG. 2 in detail.

Referring to FIGS. 7 and 8, the stitch module 400 can find an iso-pattern in the layout design or the sub-layout design B, using the processor 500. The iso-pattern means a pattern when there is no pattern of the same color as its color except oneself in the sub-layout design B. That is, it means the first pattern P1 in FIG. 8. However, at this time, as in the patterns extended long on the top and the bottom of FIGS. 7 and 8, the patterns spaced apart in a direction different from the separation direction of other patterns may be not considered.

In FIGS. 7 and 8, two second patterns P2 and third patterns P3 are present, respectively, but only one first pattern P1 is present. Therefore, the first pattern P1 is an iso-pattern.

As a degree of integration of the semiconductor element increases and the miniaturization of the pattern progresses, complexity of the graph increases, and an occurrence of the iso-pattern increases. If the iso-pattern occurs, the density of the pattern during patterning significantly decreases, and the ID bias (iso-density bias) increases. Here, the ID bias means a value which increases the critical dimension in advance so as to correct the situation in which the critical dimension is patterned to be further reduced in the etching process, depending on the density of the pattern. That is, it means a value that is corrected by the etch skew correction.

When the ID bias increases, a probability of formation of a bridge Br illustrated in FIG. 8 can increase. The bridge Br is formed between the mutually spaced patterns by the process cause to be able to allow the spaced patterns abut against each other. As a result, the reliability of the fabricated semiconductor element can be lowered.

Therefore, in order to avoid this problem, the stitch module 400 can form a stitch for reducing the ID bias. While explaining a method for fabricating a mask pattern according to example embodiments of inventive concepts, the stitch formation process of the stitch module 400 will be described below in detail.

Figure 9:
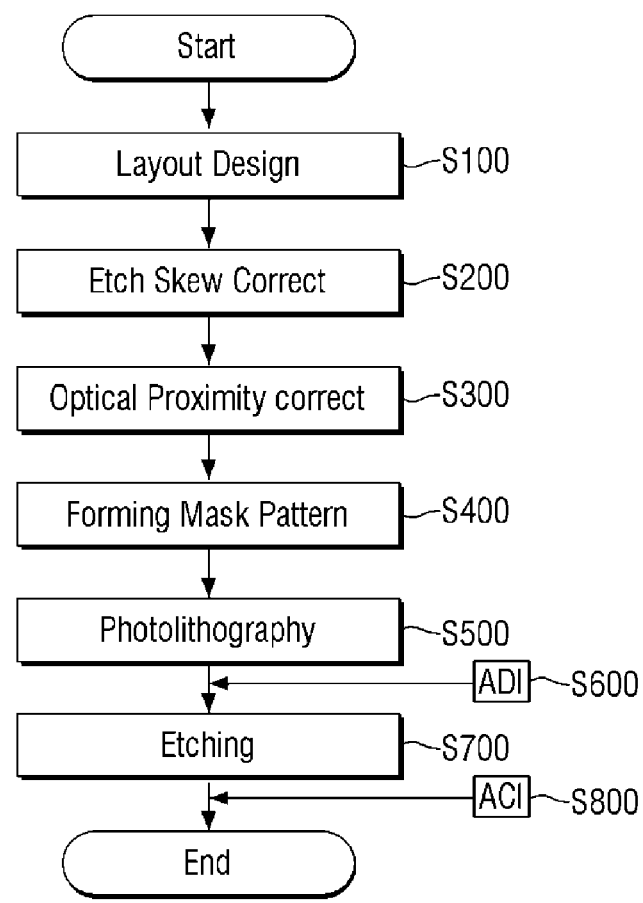
FIG. 9 is a flowchart for explaining a method for fabricating a mask pattern according to example embodiments of inventive concepts.

FIG. 9 is a flowchart for explaining a method for fabricating a mask pattern according to example embodiments of inventive concepts.

Referring to FIG. 9, first, the layout is designed (S100).

Specifically, referring to FIGS. 6 to 8, it is possible to provide a layout design, such as the layout design A or the sub-layout design B, in which the decomposition and cutting processes are completed.

The layout design can be provided to form a mask pattern later (S400). That is, the mask pattern can be formed on the basis of the layout design. When the mask pattern is formed, the patterning can be completed through the photolithography process (S500), and then through an etching process (S700).

At this time, after the photolithography process (S500), it is possible to inspect a pattern by performing an after develop inspection (ADI) (S600), and after the etching process (S700), the pattern can be inspected through the after clean inspection (ACI) (S800).

Hereinafter, the results of the patterning in the case where there is no etch-skew correction will be described referring to FIGS. 10 and 11.

Figure 10:
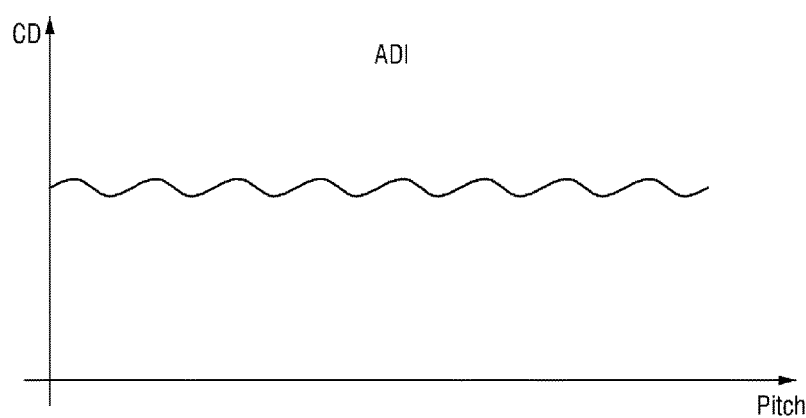
FIG. 10 is a diagram for explaining ADI results when there is no etch skew correction of FIG. 9.
Figure 11:
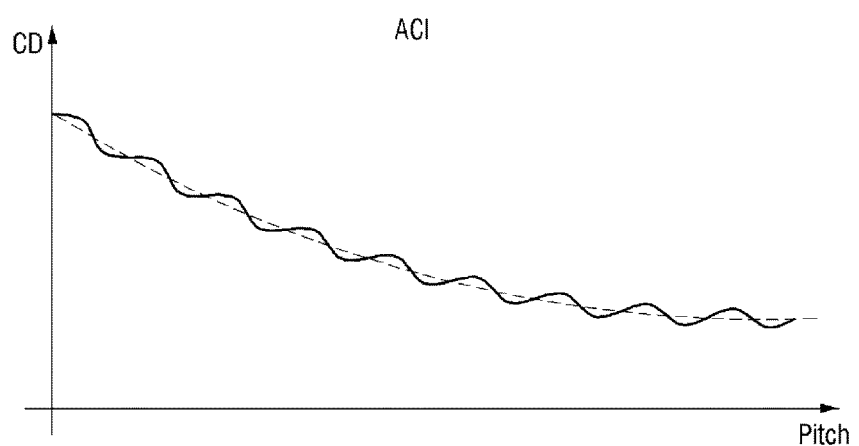
FIG. 11 is a diagram for explaining ACI results when there is no etch skew correction of FIG. 9.

FIG. 10 is a diagram for explaining the ADI results when there is no etch skew correction of FIG. 9, and FIG. 11 is a diagram for explaining the ACI results when there is no etch skew correction of FIG. 9.

Referring to FIG. 10, a horizontal axis means a pitch of the respective patterns developed by the photolithography process, and a vertical axis means a critical dimension CD of the developed pattern. Unlike example embodiments of inventive concepts, when there is no etch skew correction (S200), in the result of the ADI, the critical dimensions CD of each pattern can be uniformly formed. That is, in the pattern developed by the photolithography process (S500), the critical dimension can seem to have no problem.

Referring to FIG. 11, a horizontal axis means the pitch between each of the patterns completed by the etching process, and a vertical axis means the critical dimension CD of the completed pattern. That is, as the pitch of each of the patterns increases, the etching process excessively progresses, and the critical dimension of each of the patterns can gradually decrease. Therefore, in order to complement this problem, there is a need for ID bias, that is, the etch skew correction.

Referring to FIG. 9 again, the etch skew correction is performed (S200).

Specifically, referring to FIG. 1, etch skew corrector 20 can perform the etch skew correction. The etch skew correction means the correction performed so that the critical dimension does not decrease even after the etching, by adding the ID bias to each pattern, as described above. However, the etch skew correction may means the correction performed so that the critical dimension does not increase after etching depending on the etching type, without being limited thereto.

Hereinafter, the results of patterning of the method for fabricating the mask pattern according to example embodiments of inventive concepts where there is etch skew correction will be described referring to FIGS. 12 and 13.

Figure 13:
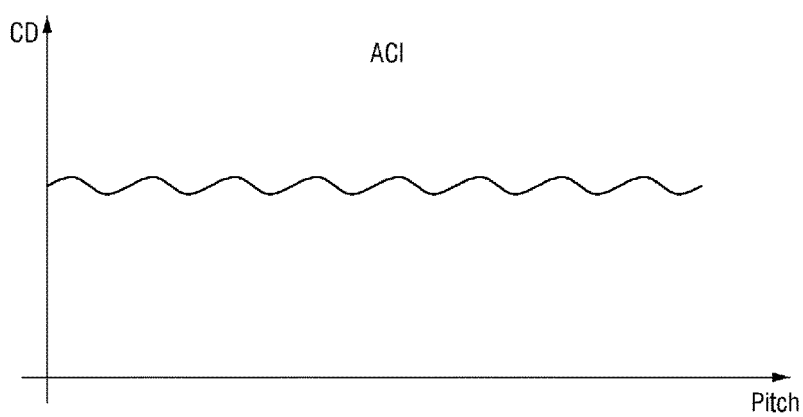
FIG. 13 is a diagram for explaining ACI results in a method for fabricating a mask pattern according to example embodiments of inventive concepts.

FIG. 12 is a diagram for explaining the ACI results of a method for fabricating a mask pattern according to example embodiments of inventive concepts, and FIG. 13 is a diagram for explaining the ACI results in the method for fabricating a mask pattern according to example embodiments of inventive concepts.

Referring to FIG. 12, the horizontal axis means the pitch of each pattern developed by the photolithography process, and the vertical axis means the critical dimension CD of the developed pattern. In the ADI results of the method for fabricating a mask pattern according to example embodiments of inventive concepts, the critical dimension CD of each pattern can be formed to be larger as the pitch of each pattern increases. This can offset the result in which the critical dimension decreases by the future etching process (S700). That is, it is the result obtained by previously performing the etch skew correction so that the final critical dimension CD is uniform.

Referring to FIG. 13, a horizontal axis means the pitch of each of the patterns completed by the etching process, and a vertical axis means the critical dimension CD of the completed pattern. In the ACI results of the method for fabricating a mask pattern according to example embodiments of inventive concepts, it is possible to maintain a uniform critical dimension according to the effect in which the etch skew of the above-mentioned etching skew correction and the etching process (S700) increases. That is, the critical dimension of the finally patterned pattern can be uniformly formed.

Hereinafter, the layout design step (S100) of FIG. 9 will be described in detail referring to FIGS. 14 to 19.

Figure 14:
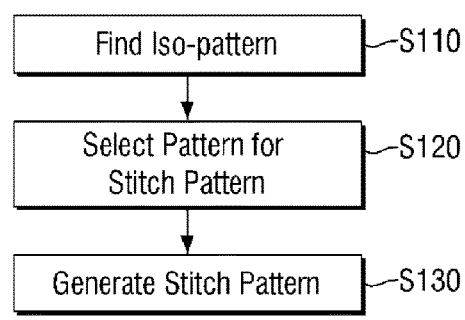
FIG. 14 is a flowchart for explaining a layout design step of FIG. 9 in detail.

FIG. 14 is a flowchart for describing the layout design step of FIG. 9 in detail.

Referring to FIG. 14, the iso-pattern is first detected (S110). For example, the layout designer 10 in FIG. 1 of the present application may detect the iso-pattern.

Figure 16:
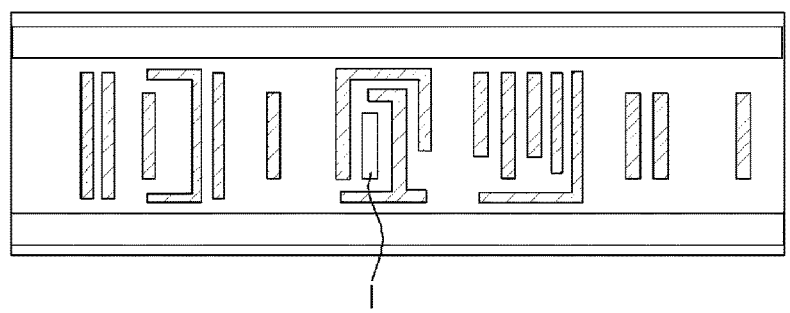
FIGS. 16 to 18 are illustrative views for explaining each step of FIG. 14.

Specifically, the iso-pattern means the pattern when there is no pattern of the same color as its color except oneself in the layout design. Referring to FIG. 16, the iso-pattern I has no choice but to be one pattern in the overall layout design or the sub-layout design. However, at this time, the patterns spaced apart in a direction different from the separation direction of the other patterns as in the patterns extended long on the top and the bottom of FIG. 16 may be not considered.

Referring to FIG. 14 again, subsequently, the pattern for the stitch pattern is selected (S120). For example, the layout designer 10 in FIG. 1 of the present application may select the iso-pattern.

Figure 17:
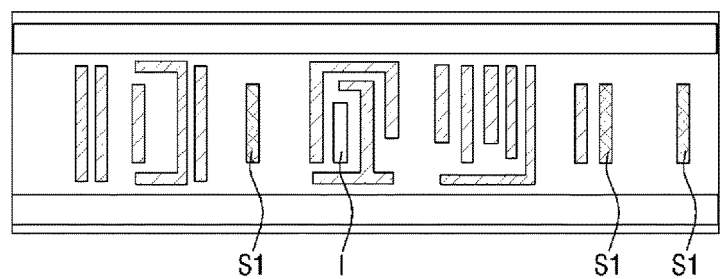

Specifically, referring to FIG. 17, the stitch pattern S1 can be at least one of the patterns spaced apart from the iso-pattern I by a desired (and/or alternatively predetermined) pitch or more. The stitch pattern S1 is a pattern that is already colored to color different from the iso-pattern I. Therefore, the color of the iso-pattern I and the already colored pattern can overlap each other later.

Hereinafter, a step (S120) for selecting a pattern for the stitch pattern will be described in detail with reference to FIG. 15.

Figure 15:
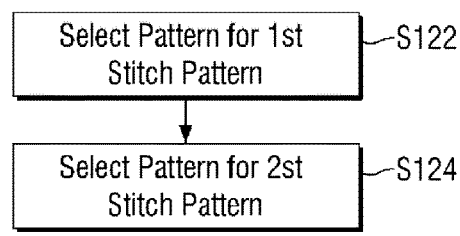
FIG. 15 is a flow chart for explaining a stitch pattern selection step of FIG. 14 in detail.

FIG. 15 is a flow chart for describing the stitch selection step of FIG. 14 in detail.

Referring to FIG. 15, first, a pattern for the first stitch pattern may be selected (S122). The pattern for the first stitch pattern may be selected by the stitch module 400 in FIG. 2 of the present application.

Specifically, referring to FIG. 17, at least one of the patterns spaced apart from the iso-pattern I by a desired (and/or alternatively predetermined) pitch or more can be determined as the pattern for the first stitch pattern S1. At this time, the desired (and/or alternatively predetermined) pitch may be larger than the minimum pitch for limiting (and/or preventing) an occurrence of the bridge.

Referring to FIG. 15 again, the pattern for the second stitch pattern is selected (S124). The pattern for the second stitch pattern may be selected by the stitch module 400 in FIG. 2 of the present application.

Figure 18:
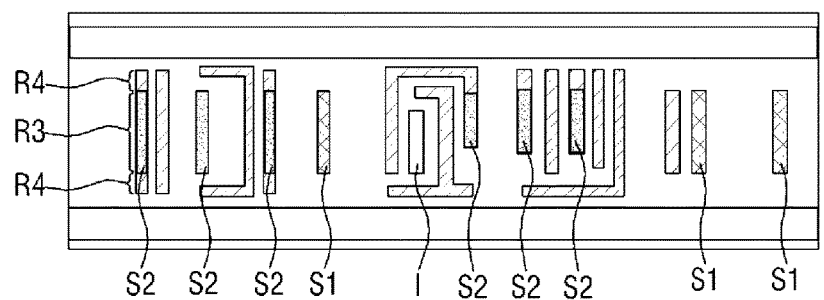

Specifically, referring to FIG. 18, at least one of the patterns spaced apart from the pattern for the first stitch pattern S1 by a desired (and/or alternatively predetermined) pitch or more can be determined as a pattern for the second stitch pattern S2. At this time, the desired (and/or alternatively predetermined) pitch may be larger than the minimum pitch for limiting (and/or preventing) an occurrence of the bridge.

Referring to FIG. 14 again, a stitch pattern may be generated (S130). The stitch pattern may be generated by the stitch module 400 in FIG. 2 of the present application.

Specifically, referring to FIG. 18, the lengths of the first stitch pattern S1 and the second stitch pattern S2 can be smaller than the total length of the pattern for the selected first stitch pattern S1 and the pattern for the second stitch pattern S2. That is, only a partial region rather than all the selected patterns may be the stitch pattern S1, S2.

Hereinafter, a step (S130) for generating the stitch pattern will be described in detail with reference to FIG. 19.

Figure 19:
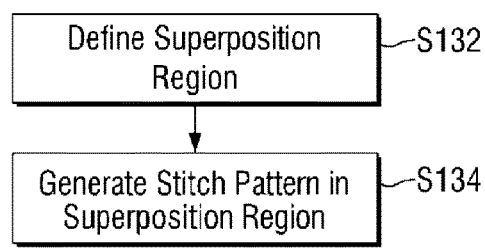
FIG. 19 is a flowchart for explaining a stitch pattern forming step of FIG. 14.

FIG. 19 is a flowchart for describing a stitch pattern forming step of FIG. 14 in detail.

Referring to FIG. 19, an superposition region may be defined (S132).

Specifically, referring to FIG. 18, the first stitch pattern S1 or the second stitch pattern S2 can include an superposition region R3 and a non-superposition region R4. However, it is not limited thereto.

The superposition region R3 can be a region in which the first stitch pattern S1 or the second stitch pattern S2 may be formed. The non-superposition region R4 can be a region in which the first stitch pattern S1 or the second stitch pattern S2 may be not formed. The superposition region R3 and the non-superposition region R4 may not overlap each other.

The superposition region R3 can be defined by the design rules. That is, the superposition region R3 can be defined in consideration of the pattern with the color of the iso-patterns P1, P2, P3. For example, it can be defined in consideration of the patterns spaced apart in a direction different from the separation direction of other patterns, like the patterns extended long on the top and the bottom of FIG. 18.

Otherwise, the length of the superposition region R3 can be defined in consideration of the length of the iso-patterns P1, P2, P3. For example, the length of the iso-patterns P1, P2, P3 may be the same as the length of the superposition region R3. However, it is not limited thereto.

Referring to FIG. 19 again, a stitch pattern may be formed in the superposition region (S134).

Specifically, referring to FIG. 18, the first and second stitch patterns S1, S2 may be formed only in the superposition region R3 and may not be formed in the superposition region R4.

In the first stitch pattern S1 or the second stitch pattern S2, the colors of the iso-patterns P1, P2, P3 can be designated to overlap each other. That is, the previously colored color and the colors of the iso-patterns P1, P2, P3 can overlap each other. The stitch patterns S1, S2 can be formed by overlapping the patterning later.

In the above description, the patterns for the first and second stitch patterns S1, S2 are first determined, and the superposition region R3 and the non-superposition region R4 are defined later. However, it is not limited thereto. It is also possible to first determine the pattern for the first stitch pattern S1, to first form the first stitch pattern S1 by defining the superposition region R3 in which the first stitch pattern S1 may be formed, and to form the second stitch pattern S2t later through the same step.

Further, in the above description, the first and second stitch patterns S1, S2 are formed. However, this is only an example, and the stitch pattern may be further formed. That is, the number of times of repeating the step of forming the stitch pattern is not particularly limited.

Referring to FIG. 2 again, the stitch module 400 of the layout designer 10 can perform the step of forming the above-mentioned stitch pattern. The layout designer 10 can form the layout design that reflects all of the decomposition process, the cutting process and the stitch forming process.

The system for fabricating a mask pattern according to example embodiments of inventive concepts forms a stitch pattern on the iso-pattern. Thus, the pitch between the iso-pattern and the pattern (stitch pattern) having the same color can be narrowed. Referring to FIG. 12, as the pitch may be narrowed, the critical dimension of the iso-pattern CD can decrease.

As a result, a risk of formation of the bridge between the iso-pattern and the peripheral pattern can decrease. If the bridge is formed, the respective patterns come into contact with each other without being spaced apart from each other, and the reliability of the semiconductor device can be lowered.

Again, referring to FIG. 9, the optical proximity correction may be performed (S300).

Specifically, referring to FIG. 1, the optical proximity corrector 30 can perform the optical proximity correction. As the pitch between the patterns on the layout design may be narrowed, the photolithography of the portion to be patterned can have a difference from the shape of the mask, and it may be possible to perform the patterning of a precise pattern by performing the optical proximity correction thereof.

Referring to FIG. 9 again, the mask pattern may be formed (S400).

Specifically, referring to FIG. 1, the mask pattern former 40 can receive the provision of the layout design to form a mask pattern. The layout design may be a layout design in which the etch skew correction and the optical proximity correction are reflected. The mask pattern former 40 can form a mask pattern on the layer in which the actual pattern may be formed.

Referring to FIG. 9 again, the photolithography (S500) may be performed after forming the mask pattern (S400), and thereafter, the etching may be performed (S700). At this time, the ADI (S600) can be performed after the photolithography (S500), and the ACI (S800) can be performed after the etching (S700).

Hereinafter, the mask pattern formation step of FIG. 9 will be described in detail referring to FIGS. 20 to 26.

Figure 20:
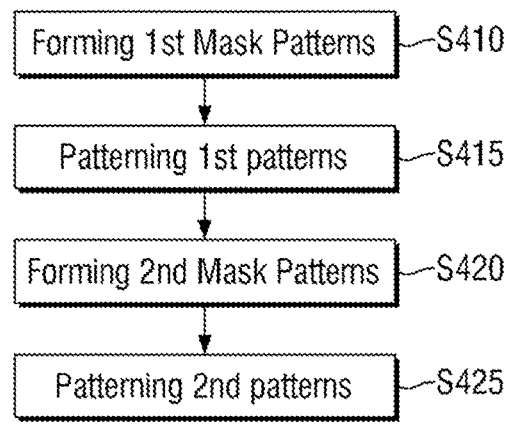
FIG. 20 is a flow chart for specifically describing a mask pattern fabricating step of FIG. 9 in detail.

FIG. 20 is a flow chart for explaining the mask pattern fabricating step of FIG. 9 in detail, and FIGS. 21 to 26 are intermediate step diagrams for explaining each step of FIG. 20.

Referring to FIG. 20, the first mask pattern may be first formed (S410).

Figure 21:
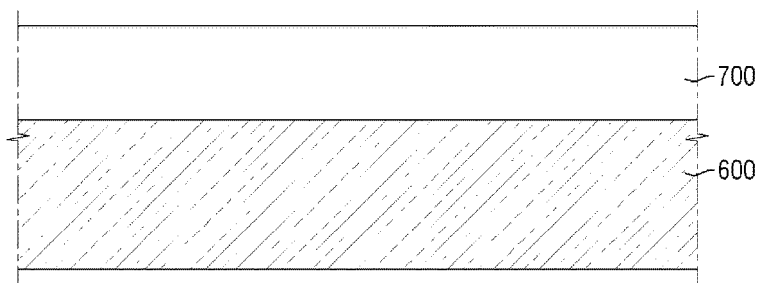
FIGS. 21 to 26 are intermediate stage diagrams for explaining each step of FIG. 20.

Specifically, referring to FIG. 21, a first mask layer 700 may be formed on a pattern forming layer 600. The pattern forming layer 600, for example, can be a semiconductor substrate. The pattern forming layer 600, for example, can be made of one or more semiconductor materials selected from the group that consists of Si, Ge, SiGe, GaP, GaAs, SiC, SiGeC, InAs and InP. However, it is not limited thereto. The pattern forming layer 600 is not particularly limited as long as it is a layer which can be patterned in a semiconductor element.

The first mask layer 700 can cover the entire upper surface of the pattern forming layer 600. However, it is not limited thereto. The first mask layer 700 can be conformally formed on the upper surface of the pattern forming layer 600.

Figure 22:
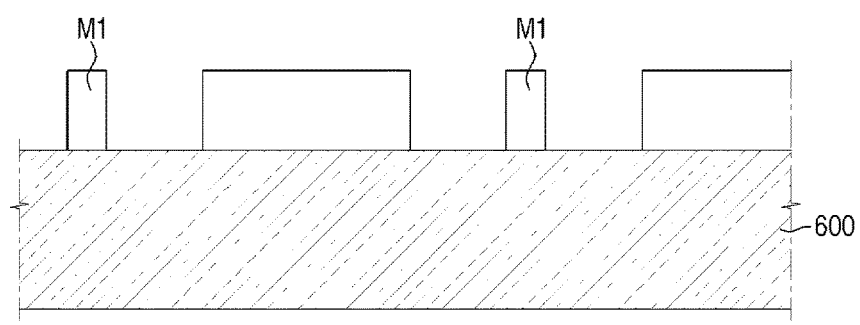

Referring to FIG. 22, the first mask layer 700 may be patterned by a first mask pattern M1. At this time, the first mask pattern M1 can be a mask pattern for patterning the pattern subjected to the etch skew correction and the optical proximity correction in the layout design. In particular, the first mask pattern M1 can be a mask pattern for patterning the pattern colored to the first color. That is, the first mask pattern M1 can be a mask pattern corresponding to the pattern colored to the first color.

At this time, the first mask layer 700 may not be patterned in a region in which the first mask pattern M1 is not formed, that is, a region in which the second mask pattern M2 is formed later.

Referring to FIG. 20 again, the first pattern may be then formed (S415).

Figure 23:
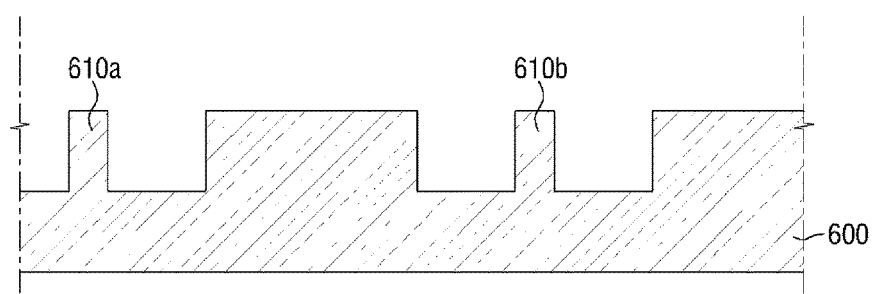

Specifically, referring to FIG. 23, the pattern forming layer 600 can be etched using the first mask pattern M1 as a mask. Thus, the first patterns 610a, 610b can be formed in the pattern forming layer 600. The first patterns 610a, 610b can be spaced apart from each other by a desired (and/or alternatively predetermined) pitch or more so that the bridges are not formed each other. After forming the first patterns 610a, 610b, the first mask layer 700 including the first mask pattern M1 can be removed. The first patterns 610a, 610b can be patterns that are colored to the same color in the layout design.

Referring to FIG. 20 again, the second mask pattern may be subsequently formed (S420).

Figure 24:
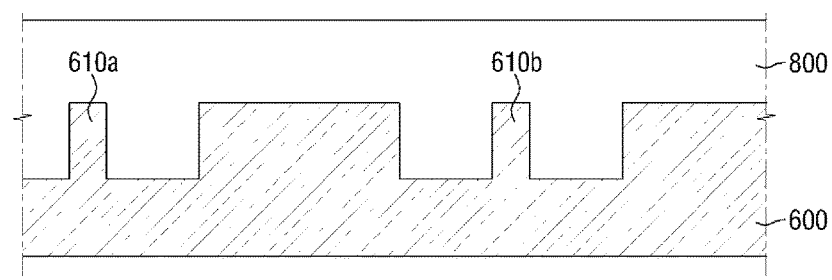

Specifically, referring to FIG. 24, a second mask layer 800 may be formed on the pattern forming layer 600. The second mask layer 800 can cover the entire upper surface of the pattern forming layer 600. However, it is not limited thereto. The second mask layer 800 can be conformally formed on the upper surface of the pattern forming layer 600. However, it is not limited thereto, and as illustrated, the pattern formation layer 600 can have a flat upper surface by filling all the patterned portions.

Figure 25:
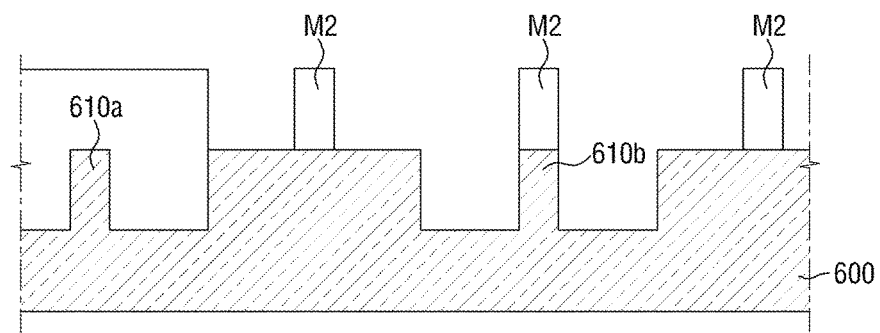

Referring to FIG. 25, the second mask layer 800 can be patterned to the second mask pattern M2. At this time, the second mask pattern M2 can be a mask pattern for patterning the pattern subjected to the etch skew correction and the optical proximity correction in the layout design. In particular, the second mask pattern M2 can be a mask pattern for patterning the patterns colored to the second color different from the first color. That is, the second mask pattern M2 can be a mask pattern corresponding to the pattern colored to the second color.

Some of the second mask pattern M2 can have the same shape as the first mask pattern M1. That is, the pattern selected to the stitch pattern and having the superposition of the first color and the second color can be patterned by both the first mask pattern M1 and the second mask pattern M2. In FIG. 25, the first pattern 610b may be already patterned by the first mask pattern M1 and then can be repetitively patterned again by the second mask pattern M2.

Again, referring to FIG. 20, the second pattern may be then formed (S425).

Figure 26:
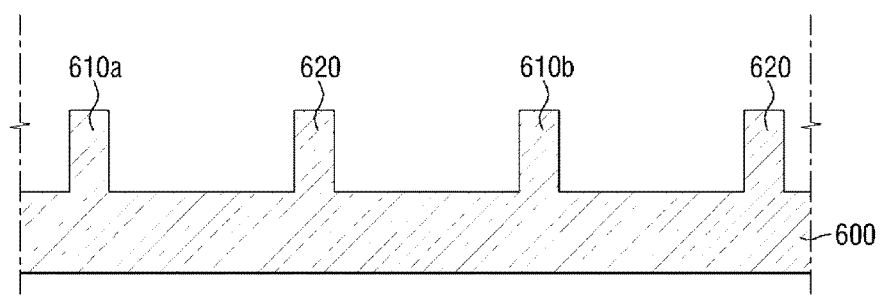

Specifically, referring FIG. 26, the pattern forming layer 600 can be etched using the second mask pattern M2 as a mask. Thus, the second patterns 610b, 620 can be formed in the pattern forming layer 600. The second patterns 610b, 620 can be spaced apart from each other by a desired (and/or alternatively predetermined) pitch or more so that the bridges are not formed each other. After forming the second patterns 610b, 620, it is possible to remove the second mask layer 800 including the second mask pattern M2. The second patterns 610b, 620 can be a pattern colored to the same color in the layout design.

At this time, the repetitively patterned pattern 610b can be patterned using both the first mask pattern M1 and the second mask pattern M2. The first mask pattern M1 and the second mask pattern M2 can have the same shape each other. Otherwise, the second mask pattern M2 can have a relationship included in the first mask pattern M1. This is because the stitch pattern may be formed in the superposition region. In other words, the repetitively patterned pattern 610b in FIG. 26 may be formed by the stitch pattern because the repetitively patterned pattern 610b may be formed using both the first mask pattern M1 and the second mask pattern M2. Thus, the "stitch pattern" may mean a virtual pattern defined by overlapping first and second patterns M1 and M2 with respect to each other.

A SoC system including a semiconductor device fabricated using the system for fabricating the mask according to example embodiments of inventive concepts will be described below referring to FIGS. 27 to 29.

Figure 27:
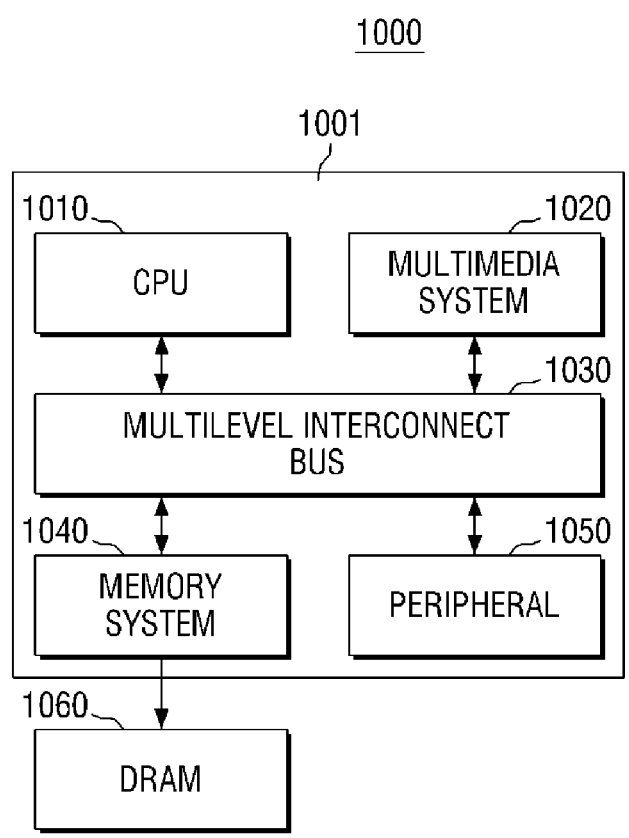
FIG. 27 is a block diagram of a SoC system including a semiconductor device that is fabricated by a mask pattern fabricated by the method for fabricating the mask pattern according to example embodiments of inventive concepts.

FIG. 27 is a block diagram of a SoC system including the semiconductor device according to example embodiments of inventive concepts. FIG. 28 is a block diagram illustrating a schematic configuration of a central processing unit of FIG. 27. FIG. 29 is a diagram illustrating a packaged form of the semiconductor device of FIG. 27.

First, referring to FIG. 27, a SoC system 1000 includes an application processor 1001 and a DRAM 1060.

The application processor 1001 can include a central processing unit 1010, a multimedia system 1020, a bus 1030, a memory system 1040 and a peripheral circuit 1050.

The central processing unit 1010 can perform the operations for driving the SoC system 1000. The central processing unit 1010 can be configured by a multi-core environment including the multiple cores.

Figure 28:
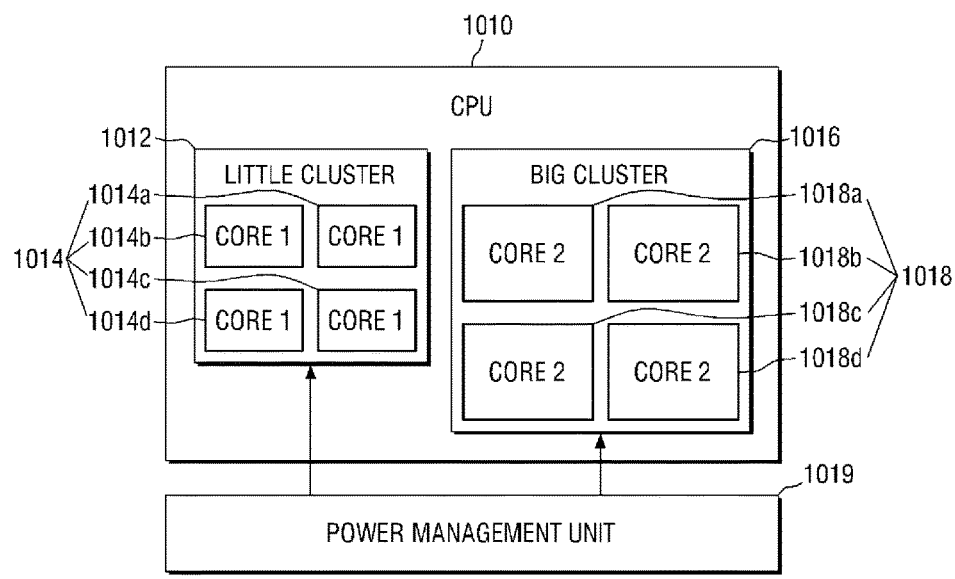
FIG. 28 is a block diagram illustrating a schematic configuration of a central processing unit of FIG. 27.

Meanwhile, as illustrated in FIG. 28, the central processing unit 1010 may be configured to include a first cluster 1012 and a second cluster 1016.

The first cluster 1012 can be disposed inside the central processing unit 1010, and the first cluster 1012 can include n (where n is a natural number) first cores 1014. In FIG. 28, for convenience of explanation, an example in which the first cluster 1012 includes the four (i.e., n=4) first cores 1014a to 1014d will be described, but example embodiments are not limited thereto.

The second cluster 1016 can be similarly disposed inside the central processing unit 1010, and the second cluster 1016 can also include n second cores 1018. As illustrated, the second cluster 1016 can be disposed so as to be separated from the first cluster 1012. An example in which the second cluster 1016 includes the four (i.e., n=4) second cores 1018a to 1018d will be described for convenience of explanation, but example embodiments are not limited thereto.

Meanwhile, although FIG. 28 illustrates a configuration in which the number of the first cores 1014 included in the first cluster 1012 may be the same as the number of the second cores 1018 included in the second cluster 1016, but example embodiments of inventive concepts are not limited thereto. In example embodiments of inventive concepts, unlike the illustrated configuration, the number of the first cores 1014 included in the first cluster 1012 may be different from the number of the second cores 1018 included in the second cluster 1016.

Also, although FIG. 28 illustrates a configuration in which only the first cluster 1012 and the second cluster 1016 are disposed inside the central processing unit 1010, example embodiments are not limited thereto. If desired, a third core (not illustrated), which is separated from the first and second clusters 1012, 1016 and includes a third cluster (not illustrated), can be additionally disposed inside the central processing unit 1010.

An amount of operation per unit time of the first core 1014 included in the first cluster 1012 may be different from an amount of operation per unit time of the second core 1018 included in the second cluster 1016.

For example, the first cluster 1012 can be a little cluster, and the second cluster 1016 can be a big cluster. In this case, the amount of operation per unit time of the first core 1014 included in the first cluster 1012 can be smaller than the amount of operation per unit time of the second core 1018 included in the second cluster 1016.

Therefore, the amount of operation per unit time when all the first cores 1014 included in the first cluster 1012 are enabled to perform the operation can be smaller than amount of operation per unit time when all the second cores 1018 included in the second cluster 1016 are enabled to perform the operation.

Meanwhile, the amount of operation per unit time between the first-1 to first-4 cores 1014a to 1014d included in the first cluster 1012 can be the same, and the amount of operation per unit time between the second-1 to second-4 cores 1018a to 1018d included the second cluster 1016 can also be the same. That is, for example, when the amount of operation per unit time of each of the first-1 to first-4 cores 1014a to 1014d is assumed to be 10, the amount of operation per unit time of each of the second-1 to second-4 cores 1018a to 1018d can be 40.

If desired, a power management unit 1019 can enable or disable the first cluster 1012 and the second cluster 1016. Specifically, if the operation is required by the first cluster 1012, the power management unit 1019 can enable the first cluster 1012 and disable the second cluster 1016. Moreover, on the contrary, if the operation is required by the second cluster 1016, the power management unit 1019 can enable the second cluster 1016 and disable the first cluster 1012. Further, when the amount of operation to be performed can be sufficiently processed through the first-1 core 1014a included in the first cluster 1012, the power management unit 1019 can enable the first cluster 1012 and disable the second cluster 1016 and can enable the first-1 core 1014a and disable the first-2 to first-4 cores 1014b to 1014d in the first cluster 1012. In other words, example embodiments of inventive concepts, the power management unit 1019 can also determine whether to enable the entire first and second clusters 1012, 1016 and can also determine whether to enable each of the first-1 to first-4 cores 1014a to 1014d included in the first cluster 1012 and each of the second-1 to second-4 cores 1018a to 1018d included in the second cluster 1016.

The operation in which the power management unit 1019 enables the first and second clusters 1012, 1016 and/or the plurality of cores 1014a to 1014d, 1018a to 1018d included therein can be an operation of supplying the power source to the first and second clusters 1012, 1016 and/or the plurality of cores 1014a to 1014d included therein to operate them. Moreover, the operation in which the power management unit 1019 disables the first and second clusters 1012, 1016 and/or the plurality of cores 1014a to 1014d, 1018a to 1018d included therein can be an operation of cutting off the power source supplied to the first and second clusters 1012, 1016 and/or the plurality of cores 1014a to 1014d included therein to stop the operation of them.

The power management unit 1019 enables only the particular clusters 1012, 1016 and/or the plurality of cores 1014a to 1014d, 1018a to 1018d included therein depending on the operating environment of the SoC system 1000, thereby being able to manage the power consumption of the entire SoC system 1000.

Referring to FIG. 27 again, the multimedia system 1020 may be used to perform a variety of multimedia functions in the SoC system 1000. The multi-media system 1020 can include a 3D engine module, a video codec, a display system, a camera system, a post-processor and the like.

The bus 1030 can be used to perform the mutual data communication of the central processing unit 1010, the multi-media system 1020, the memory system 1040 and the peripheral circuit 1050. In example embodiments of inventive concepts, the bus 1030 can have a multi-layer structure. Specifically, as examples of the bus 1030, a multi-layer AHB (multi-layer Advanced High-performance Bus) or a multi-layer AXI (multi-layer Advanced eXtensible Interface) can be used, but example embodiments are not limited thereto.

The memory system 1040 can provide an environment in which the application processor 1001 is connected to an external memory (e.g., DRAM 1060) to perform the high-speed operation. In example embodiments of inventive concepts, the memory system 1040 may include another controller (e.g., DRAM controller) for controlling the external memory (e.g., DRAM 1060).

The peripheral circuit 1050 can provide an environment in which the SoC system 1000 is smoothly connected to an external device (e.g., a main board). Thus, the peripheral circuit 1050 can be provided with various interfaces which make the external device connected to the SoC system 1000 compatible.

The DRAM 1060 can function as an operation memory used for operating the application processor 1001. In example embodiments of inventive concepts, as illustrated, the DRAM 1060 can be disposed outside the application processor 1001. Specifically, the DRAM 1060 can be packaged in the form of PoP (Package on Package) together with the application processor 1001.

Figure 29:
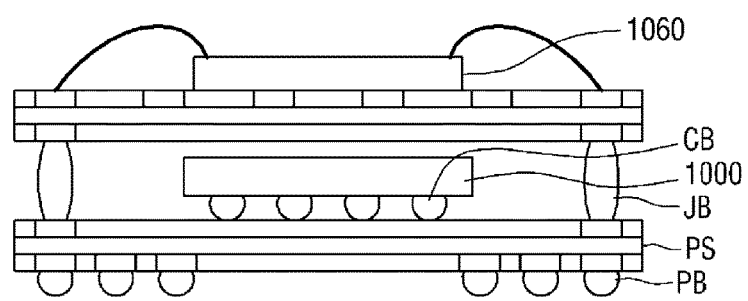
FIG. 29 is a diagram illustrating a packaged form of the semiconductor device of FIG. 27.

Referring to FIG. 29, in example embodiments of inventive concepts, the semiconductor package can include the package substrate PS, the DRAM 1060 and the application processor 1001.

The package substrate PS can include a plurality of package balls PB. The plurality of package balls PB can be electrically connected to the chip balls CB of the application processor 1001 through an internal signal line of the package substrate PS, and can be electrically connected to the joint ball JB through the internal signal line of the package substrate PS.

Meanwhile, as illustrated, the DRAM 1060 can be electrically connected to the joint ball JB through the wire bonding.

The application Processor 1001 can be disposed below the DRAM 1060. The chip balls CB of the application processor 1001 can be electrically connected to the DRAM 1060 through the joint ball JB.

Meanwhile, FIG. 29 illustrates only a configuration in which the DRAM 1060 is disposed outside the application processor 1001, but example embodiments of inventive concepts are not limited thereto. If desired, the DRAM 1060 may be disposed inside the application processor 1001.

At least one of the components of these SoC systems 1000 can be fabricated using the layout design systems 1 to 3 according to example embodiments of inventive concepts. The semiconductor devices 4, 5 according to example embodiments of inventive concepts can be provided as one of the components of the SoC system 1000.

Next, an electronic system including the semiconductor device according to example embodiments of inventive concepts will be described referring to FIG. 30.

Figure 30:
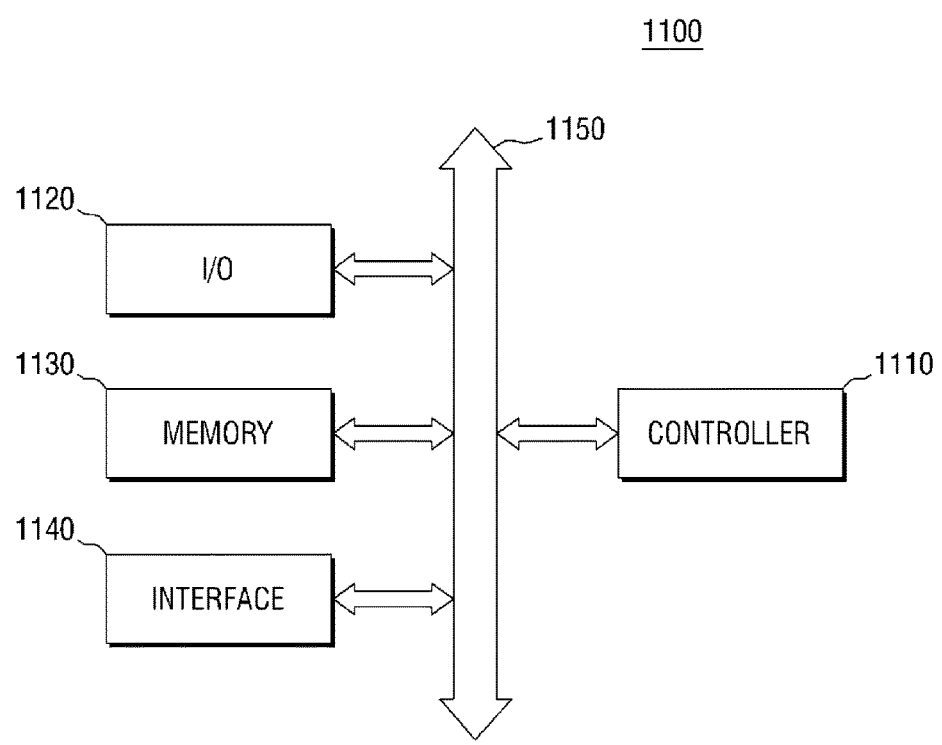
FIG. 30 is a block diagram of an electronic system including a semiconductor device that is fabricated by a mask pattern fabricated by the method for fabricating the mask pattern according to example embodiments of inventive concepts.

FIG. 30 is a block diagram of an electronic system including semiconductor devices according to example embodiments of inventive concepts.

Referring to FIG. 30, the electronic system 1100 according to example embodiments of inventive concepts can include a controller 1110, an input/output device (I/O) 1120, a memory device 1130, an interface 1140 and a bus 1150. The controller 1110, the input/output device 1120, the memory device 1130 and/or the interface 1140 can be coupled together via the bus 1150. The bus 1150 corresponds to a path through which the data are moved.

The controller 1110 can include at least one of a microprocessor, a digital signal process, a microcontroller, and logic elements capable of performing the functions similar to these elements. The input/output device 1120 can include a keypad, a keyboard, a display device and the like. The memory device 1130 can store data and/or instruction words. The interface 1140 can perform the functions of transferring the data to the communication network or receiving the data from the communication network. The interface 1140 can be in a wired or wireless form. For example, the interface 1140 can include an antenna or a wired and wireless transceiver.

Although it is not illustrated, the electronic system 1100 can further include high-speed DRAM and/or SDRAM as an operation memory for improving the operation of the controller 1110. At this time, as the operation memory, in example embodiments of inventive concepts, the semiconductor device 99b can be adopted. Also, in example embodiments of inventive concepts, the semiconductor device 98b can be provided inside the memory device 1130 or can be provided as a part of the controller 1110, the input/output device (I/O) 1120 or the like.

The electronic system 1100 can be applied to a personal digital assistant (PDA), a portable computer, a web tablet, a wireless phone, a mobile phone, a digital music player, a memory card or all electronic products that can transmit and/or receive information in a wireless environment.

Figure 31:
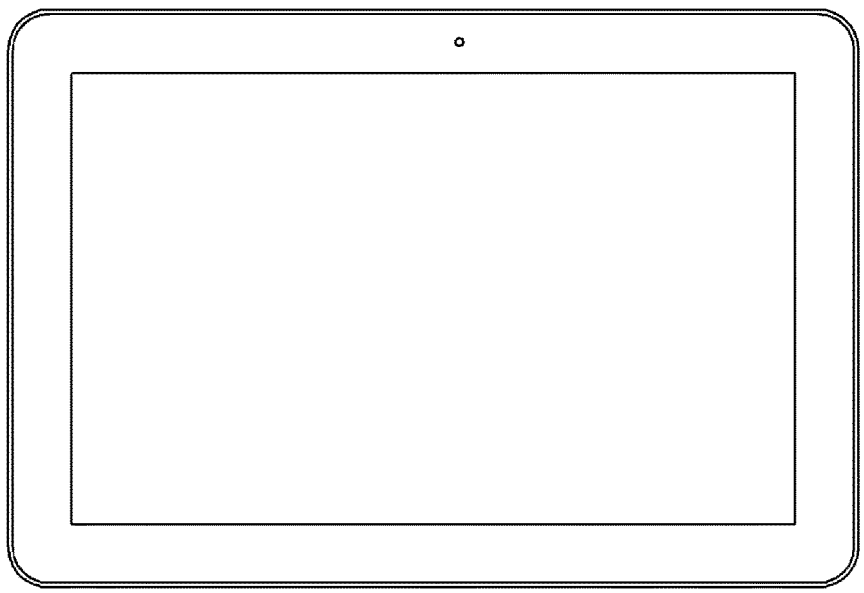
FIGS. 31 to 33 semiconductor systems according to example embodiments of inventive concepts.
Figure 32:
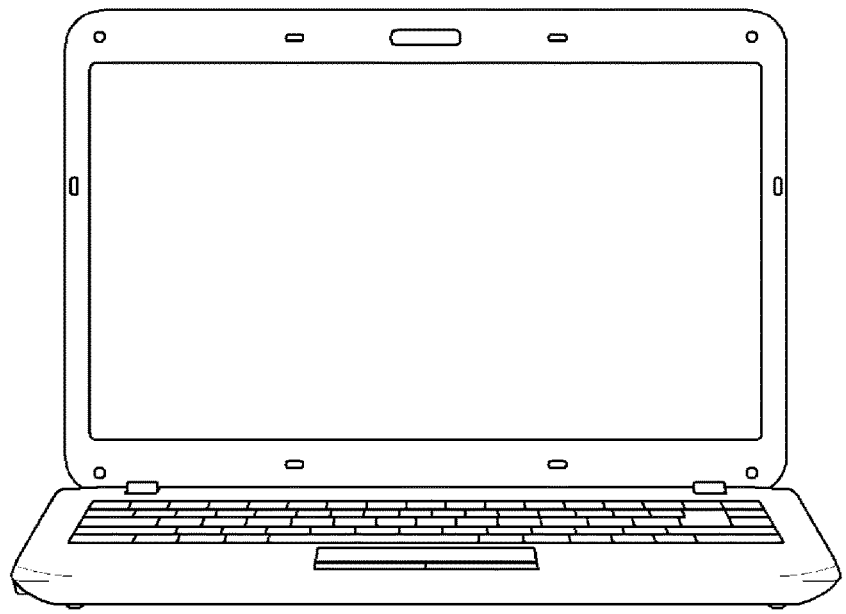
Figure 33:
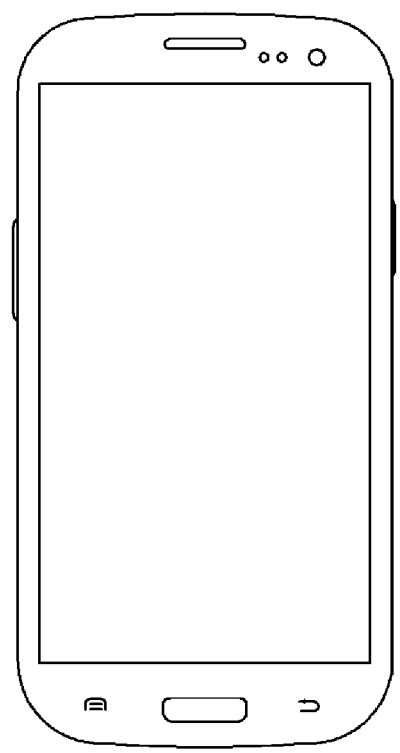

FIGS. 31 to 33 semiconductor systems according to example embodiments of inventive concepts.

FIG. 31 is a diagram illustrating a tablet PC 1200, FIG. 32 is a diagram illustrating a laptop computer 1300, and FIG. 33 is a diagram illustrating a smart phone 1400. Semiconductor devices according to example embodiments of inventive concepts can be used in the tablet PC 1200, the laptop computer 1300, the smart phone 1400 or the like.

Further, it will be apparent to those skilled in the art that the semiconductor devices according to example embodiments of inventive concepts are also applicable to other integrated circuit devices that are not illustrated. That is, although only the tablet PC 1200, the laptop computer 1300 and the smart phone 1400 are described above as an example of the semiconductor system according to example embodiments of inventive concepts, example embodiments of inventive concepts are not limited thereto. In example embodiments of inventive concepts, the semiconductor system may be achieved by a computer, an ultra mobile PC (UMPC), a workstation, a net-book, personal digital assistants (PDA), a portable computer, a wireless phone, a mobile phone, an e-book, a portable multimedia player (PMP), a portable game machine, a navigation device, a black box, a digital camera, a 3-dimensional television, a digital audio recorder, a digital audio player, a digital picture recorder, a digital picture player, a digital video recorder, a digital video player or the like.

As described above, in methods according to example embodiments, as a number of stitch patterns is increased, the ID bias may be reduced and the likelihood of bridges may be reduced. It should be understood that example embodiments described herein should be considered in a descriptive sense only and not for purposes of limitation. Descriptions of features or aspects within each device or method according to example embodiments should typically be considered as available for other similar features or aspects in other devices or methods according to example embodiments. While some example embodiments have been particularly shown and described, it will be understood by one of ordinary skill in the art that variations in form and detail may be made therein without departing from the spirit and scope of the claims.

What is claimed is:

1. A layout design system comprising:
a layout designer including,
  a processor, and
  a storage unit coupled to the processor,
    the storage unit configured to store a layout design and a stitch module,
    the layout design including a first pattern group and a second pattern group disposed in accordance with a design,
    the first pattern group including a first pattern for patterning at a first time,
    the second pattern group including a second pattern for patterning at a second time that is different than the first time,
    the processor, in response to executing the stitch module, being configured to detect an iso-pattern of the second pattern,
    the processor, in response to executing stitch module, being configured to modify the second pattern group by designating at least one structure of the first pattern, which is spaced apart from the iso-pattern by a desired pitch or more, to the second pattern group such that the at least one structure of the first pattern is repetitively designated in the first pattern group and the second pattern group,
    the desired pitch corresponding to a minimum pitch for limiting an occurrence of a bridge; and
a mask pattern former configured to form a first mask pattern corresponding to the first pattern at the first time and to form a second mask pattern corresponding to the second pattern at the second time based on the layout design, the mask pattern former being configured to form the first pattern at the first time and the second pattern at the second time on a tangible layer.

2. The layout design system of claim 1, wherein the storage unit is configured to store a cutting module, and the processor, in response to executing the cutting module, is configured to divide the layout design into a plurality of sub-layout designs.

3. The layout design system of claim 2, wherein the processor, in response to executing the cutting module, is configured to divide the layout design so the iso-pattern exists alone in one of the sub-layout designs.

4. The layout design system of claim 2, wherein the processor, in response to executing the cutting module, is configured to base a length of the sub-layout designs on an etch skew.

5. The layout design system of claim 1, wherein the storage unit is configured to store a decomposition module, the processor, in response to executing the decomposition module, is configured to supply the storage unit with a pre layout design including a plurality of patterns, the processor is configured to convert the plurality of patterns into nodes, and the processor is configured to generate a link connecting the nodes to classify the plurality of patterns into the first pattern group or the second pattern group and form the layout design.

6. The layout design system of claim 5, wherein the processor, in response to executing the decomposition module, is configured to classify the nodes sharing the link into different groups of each of the first pattern group and the second pattern group.

7. The layout design system of claim 6, wherein the processor, in response to executing the decomposition module, is configured to classify a pattern, which cannot be classified into both the first pattern group and the second pattern group, into a conflict pattern, the conflict pattern includes a first region and a second region partially overlapping each other, the processor, in response to executing the stitch module, is configured to classify the first region into the first pattern group, the processor, in response to executing the stitch module, is configured to classify the second region into the second pattern group, and the processor, in response to executing the stitch module, is configured to repetitively designate a region in which the first region and the second region overlap each other in the first pattern group and the second pattern group.

8. The layout design system of claim 7, wherein the processor, in response to executing the stitch module, is configured to determine the first region and the second region in accordance with a design rule.

9. The layout design system of claim 1, wherein the first pattern includes a plurality of first pattern structures, the second pattern includes a plurality of second pattern structures and the iso-pattern, the processor, in response to executing the stitch module, is configured to modify the second pattern group by designating the at least one of the plurality of first pattern structure using a first repetitive designation operation and a second repetitive designation operation, the first repetitive designation operation includes designating a first number of the plurality of first patterns structures that are spaced apart from the iso-pattern by the desired pitch or more into the second pattern group to form a first repetitively designated first pattern, and the second repetitive designation operation includes designating a second number of the plurality of first patterns structures that are spaced apart from the first repetitively designated first pattern by the desired pitch or more into the second pattern group.

10. The layout design system of claim 1, wherein the layout design includes a conflict pattern, the conflict pattern includes a superposition region and a non-superposition region that do not overlap each other, the processor, in response to executing the stitch module, is configured to repetitively designate the superposition region of the conflict pattern into the first pattern and the second pattern, and divide a designation of the non-superposition region such that a first portion of non-superposition region is designated into the first pattern and a second portion of the non-superposition region is designated into the second pattern.

11. The layout design system of claim 10, wherein the processor is configured to determine a length of the superposition region in consideration of an etch skew.

12. The layout design system of claim 1, wherein a design rule includes separation between the first pattern and the second pattern by a regular pitch or more.

13. The layout design system of claim 1, wherein the first time is faster than the second time.

14. The layout design system of claim 1, wherein the layout designer is configured to modify the layout from a first layout to a second layout, the first layout having at least one structure of the first pattern designated in the first pattern group but not the second pattern group, and the second layout having the least one structure of the first pattern repetitively designated in the first pattern group and the second pattern group.

15. The layout design system of claim 14, further comprising: an etch skew corrector configured to correct critical dimensions of the first and second patterns of the second layout.

16. The layout design system of claim 1, further comprising:

a layout designer including a storage unit, a decomposition module, a stitch module, and the processor, the storage unit being configured to store a layout design, the processor, in response to executing the decomposition module, being configured to decompose the layout design into a plurality of pattern groups, using the processor, the plurality of pattern groups including a third pattern group including a third pattern, the first pattern group including a plurality of first patterns for patterning at a first time, and the second pattern group including a plurality of second patterns for patterning at the second time after the first time, the plurality of first patterns including the first pattern, the plurality of second patterns including the second pattern, the plurality of first patterns, the plurality of second patterns, and the third patterns being spaced apart from each other in a plan view, the processor, in response to executing the stitch module, being configured to designate the third pattern as the iso pattern, the processor, in response to executing the stitch module being, configured to generate a stitch pattern using the processor for reducing an iso-density (ID) bias of the iso-pattern compared to the ID bias of the iso pattern without the stitch pattern being formed, the stitch pattern including a first stitch pattern and a second stitch pattern, the first stitch pattern overlapping the third pattern, the second stitch pattern overlapping one of the plurality of first patterns, one of the second patterns;

the first stitch pattern being spaced apart from a first side of the iso pattern by a first distance, the second stitch pattern being spaced apart from a second side of the iso pattern by a second distance, and the second distances each being greater than or equal to the minimum pitch away from the iso pattern for limiting the occurrence of a bridge.

17. The layout design system of claim 16, further comprising at least one of:
   an etch skew corrector configured to adjust critical dimensions of the third pattern and the plurality of first patterns using the processor based on respective pitches of the third pattern and the plurality of first patterns; or
   an optical proximity corrector configured to perform optical proximity correction (OPC) on the layout after the layout is subjected to an etch skew correction using the etch skew corrector.

18. The layout design system of claim 16, wherein the storage unit is a non-volatile memory device, a hard disk drive, or a magnetic storage device.

19. The layout design system of claim 1, wherein the storage unit includes a first storage unit and a second storage unit that are separate from each other,
   the first storage unit is configured to store the layout design, and
   the second storage unit is configured to store the stitch module.

* * * * *